(12) United States Patent
Ali et al.

(10) Patent No.: US 12,485,924 B1
(45) Date of Patent: Dec. 2, 2025

(54) METHOD AND SYSTEM FOR CONTROLLING AUTONOMOUS VEHICLES

(71) Applicant: IMAM MOHAMMAD IBN SAUD ISLAMIC UNIVERSITY, Riyadh (SA)

(72) Inventors: Shehzad Ali, Seoul (KR); Md Tanvir Islam, Seoul (KR); Ik Hyun Lee, Seoul (KR); Abdul Khader Jilani Saudagar, Riyadh (SA); Khan Muhammad, Seoul (KR)

(73) Assignee: IMAM MOHAMMAD IBN SAUD ISLAMIC UNVIERSITY, Riyadh (SA)

( * ) Notice: Subject to any disclaimer, the term of this patent is extended or adjusted under 35 U.S.C. 154(b) by 0 days.

(21) Appl. No.: 19/265,255

(22) Filed: Jul. 10, 2025

(51) Int. Cl.
*B60W 30/14* (2006.01)
*B60W 60/00* (2020.01)

(52) U.S. Cl.
CPC ...... *B60W 60/0015* (2020.02); *B60W 30/143* (2013.01); *B60W 2520/10* (2013.01); *B60W 2554/4029* (2020.02); *B60W 2554/80* (2020.02); *B60W 2555/60* (2020.02)

(58) Field of Classification Search
CPC .......... B60W 60/0015; B60W 30/143; B60W 2520/10; B60W 2554/4029; B60W 2554/80; B60W 2555/60
See application file for complete search history.

(56) References Cited

U.S. PATENT DOCUMENTS

| | | | |
|---|---|---|---|
| 11,653,090 B1* | 5/2023 | Farjadrad | H04N 23/661 348/143 |
| 12,146,757 B2* | 11/2024 | Taieb | G05D 1/0246 |
| 2016/0225259 A1* | 8/2016 | Harris | H04W 28/0247 |
| 2018/0257615 A1* | 9/2018 | Rawashdeh | G06V 20/584 |
| 2019/0180617 A1* | 6/2019 | Hori | B60W 50/0097 |
| 2022/0009491 A1* | 1/2022 | Taruoka | B60W 30/18154 |
| 2022/0019225 A1* | 1/2022 | Foley | G06V 10/806 |
| 2022/0073077 A1 | 3/2022 | Taieb et al. | |

(Continued)

FOREIGN PATENT DOCUMENTS

| CN | 115063987 A | 9/2022 |
|---|---|---|
| CN | 115984825 A | 4/2023 |

*Primary Examiner* — Tyler J Lee
(74) *Attorney, Agent, or Firm* — Oblon, McClelland, Maier & Neustadt, L.L.P.

(57) ABSTRACT

A method of controlling an autonomous vehicle includes capturing video data of an environment surrounding the autonomous vehicle. The method includes detecting a state of a traffic light and identifying whether the state is a flashing signal or regular cyclic state colors. The method includes analyzing congestion at an intersection; calculating distance from nearby vehicles; and determining whether there is sufficient green light time to safely cross the intersection without blocking traffic. The method includes executing a stop instruction to stop the autonomous vehicle when a presence of the pedestrian is detected. The method includes operating a surrounding scanning circuitry when the traffic light is in a flashing state. The method includes analyzing the surroundings at an intersection; detecting pedestrians, nearby vehicles, and traffic signs. The method includes executing a control circuitry to control the behavior of the autonomous vehicle and navigate safely.

20 Claims, 16 Drawing Sheets

(56) References Cited

U.S. PATENT DOCUMENTS

| | | | |
|---|---|---|---|
| 2022/0383743 A1 | 12/2022 | Oren et al. | |
| 2023/0222905 A1* | 7/2023 | Xu | G08G 1/0112 |
| | | | 340/913 |
| 2023/0271548 A1* | 8/2023 | Shibata | B60Q 1/543 |
| | | | 340/468 |
| 2023/0386330 A1* | 11/2023 | Nguyen | G08G 1/056 |
| 2024/0051504 A1 | 2/2024 | Jeong | |
| 2024/0304081 A1* | 9/2024 | Zhang | G08G 1/0145 |
| 2024/0369376 A1* | 11/2024 | Zhang | G01C 21/3822 |
| 2025/0148912 A1* | 5/2025 | Jacobson | G01S 17/931 |

* cited by examiner

METHOD AND SYSTEM FOR CONTROLLING AUTONOMOUS VEHICLES

BACKGROUND

Technical Field

The present disclosure is directed to autonomous vehicles, and more particularly to a method and a system for controlling an autonomous vehicle by detecting and recognizing a flashing traffic light and obstacles in a congested environment surrounding the autonomous vehicle.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Autonomous vehicles are achieving significant advancements particularly when operating under structured and predictable conditions. However, the autonomous vehicles continue to face challenges when navigating under complex and irregular traffic scenarios, particularly in the presence of flashing traffic light signals and heavily congested intersections. Such situations require continuous, context-aware decision-making that conventional techniques fail to achieve while controlling movement of autonomous vehicles during navigation. This leads to potential traffic violations, operational delays, and an increased risk of accidents and fatalities. The conventional techniques for traffic light signal detection and recognition primarily focus on the standard operation of traffic lights, namely cycling between red, green, and yellow signals, under various environmental conditions. Some improved techniques have been developed to handle more difficult traffic signal detection, considering challenging visibility scenarios, such as low-light, snow, or hazy environments, and enhance recognition accuracy, speed, and robustness under fluctuating visibility conditions. Further, some conventional techniques extend traffic scene understanding by additionally detecting associated features like multi-lane markings, intersection stop lines, and employing lightweight, real-time recognition systems suited for rapid decision-making in dynamic environments.

To support these technological advancements provided by the conventional techniques, several publicly available datasets have been curated, offering diverse traffic lights and road sign images captured across different weather, lighting, and environmental conditions. These datasets have significantly improved the training and validation of machine learning-based detection models, facilitating the development of more reliable and accurate systems for typical traffic light operations of autonomous vehicles. Despite this progress, the conventional techniques remain primarily limited in scope. In particular, the conventional techniques are mainly designed to recognize standard traffic light signals and adapt to environmental challenges, but still do not adequately address more complex and variable real-world traffic situations. In particular, flashing traffic lights, which often indicate unusual driving conditions requiring cautious or modified behavior, are insufficiently handled by the conventional techniques.

Additionally, the conventional techniques tend to rely on predefined rule-based logic, without fully considering surrounding context such as pedestrian movement, the presence of nearby vehicles, or additional traffic signage. Such a lack of consideration of the surrounding context often necessitates a need for human intervention, falling short of a goal of achieving complete vehicular autonomy for the autonomous vehicles. Similarly, the challenge of navigating under congested intersections has not been fully addressed by the conventional techniques. In particular, the conventional techniques lack robust mechanisms to assess real-time traffic density, calculate safe distances, predict green light durations, and make optimal decisions about whether to proceed or yield. These shortcomings can cause unsafe maneuvers, intersection blockages, traffic violations, and disruptions to overall traffic flow. Thus, while notable advancements have been made in standard traffic light signals detection under typical visual conditions, there remains a significant gap in autonomous vehicles' technological ability to effectively manage flashing traffic lights and congested intersections. Therefore, there is a need for an adaptable system for autonomous vehicles that can dynamically evaluate the surrounding environment and traffic conditions and enable safer, regulation-compliant, and more efficient navigation in these complex scenarios.

Accordingly, it is one object of the present disclosure to provide a method and a system for controlling an autonomous vehicle. An object of the present disclosure includes a system that integrates real-time video data analysis, environmental sensing, and traffic regulation awareness to optimize vehicle navigation to effectively manage flashing traffic lights and congested intersections.

SUMMARY

In an exemplary embodiment, an autonomous vehicle control system is disclosed. The autonomous vehicle control system includes at least one sensor configured to capture video data of an environment surrounding an autonomous vehicle. The autonomous vehicle control system includes a controller including a processor. The processor includes a vehicle control circuitry. The processor further includes a surrounding scanning circuitry configured to detect pedestrians, vehicles, and traffic signs using the captured video data and a trained object detection model. The processor further includes a traffic light state recognition circuitry configured to detect and distinguish a state of a traffic light, identifying whether the state is a flashing signal or regular cyclic state colors. The processor further includes a traffic condition monitoring circuitry configured to operate when the traffic light is in a regular cyclic (non-flashing) state, analyze congestion at an intersection, calculate distance from nearby vehicles, and determine whether there is sufficient green light time to safely cross the intersection without blocking traffic. The vehicle control circuitry is configured to execute a stop instruction to stop the autonomous vehicle when at least one pedestrian is detected by the surrounding scanning circuitry. Further, adjust a movement of the autonomous vehicle based on speed and distance measured by the surrounding scanning circuitry, and change the movement of the autonomous vehicle based on a traffic sign recognized by the surrounding scanning circuitry.

In another exemplary embodiment, a method of controlling an autonomous vehicle is disclosed. The method includes capturing, by at least one sensor, video data of an environment surrounding the autonomous vehicle. The method includes detecting, by a surrounding scanning circuitry, at least one pedestrian, at least one vehicle, and a traffic sign using the captured video data and a trained object detection model. The method includes detecting, by a traffic light state recognition circuitry, a state of a traffic light, and identifying whether the state is a flashing signal or regular state colors. The method includes operating a traffic condition monitoring circuitry when the traffic light is in a normal (non-flashing) state. The method includes analyzing congestion at an intersection. The method includes calculating distance from nearby vehicles. The method includes determining whether there is sufficient green light time to safely cross the intersection without blocking traffic. When a presence of the at least one pedestrian is detected, executing, by a vehicle control circuitry, a stop instruction to stop the autonomous vehicle; measuring speed and distance of the nearby vehicles; adjusting, by the vehicle control circuitry, a movement of the autonomous vehicle based on the measured speed and distance; and changing, by the vehicle control circuitry, the movement of the autonomous vehicle based on the detected traffic sign.

In another exemplary embodiment, a non-transitory computer readable medium having instructions stored therein that, when executed by one or more processor, cause the one or more processors to perform a method of controlling an autonomous vehicle. The method includes capturing, by at least one sensor, video data of an environment surrounding the autonomous vehicle. The method includes detecting, by a surrounding scanning circuitry, at least one pedestrian, at least one vehicle, and a traffic sign using the captured video data and a trained object detection model. The method includes detecting, by a traffic light state recognition circuitry, a state of a traffic light, and identifying whether the state is a flashing signal or regular state colors. The method includes operating a traffic condition monitoring circuitry when the traffic light is in a normal (non-flashing) state. The method includes analyzing congestion at an intersection. The method includes calculating distance from nearby vehicles. The method includes determining whether there is sufficient green light time to safely cross the intersection without blocking traffic. When a presence of the at least one pedestrian is detected, executing, by a vehicle control circuitry, a stop instruction to stop the autonomous vehicle; measuring speed and distance of the nearby vehicles; adjusting, by the vehicle control circuitry, a movement of the autonomous vehicle based on the measured speed and distance; and changing, by the vehicle control circuitry, the movement of the autonomous vehicle based on the detected traffic sign.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
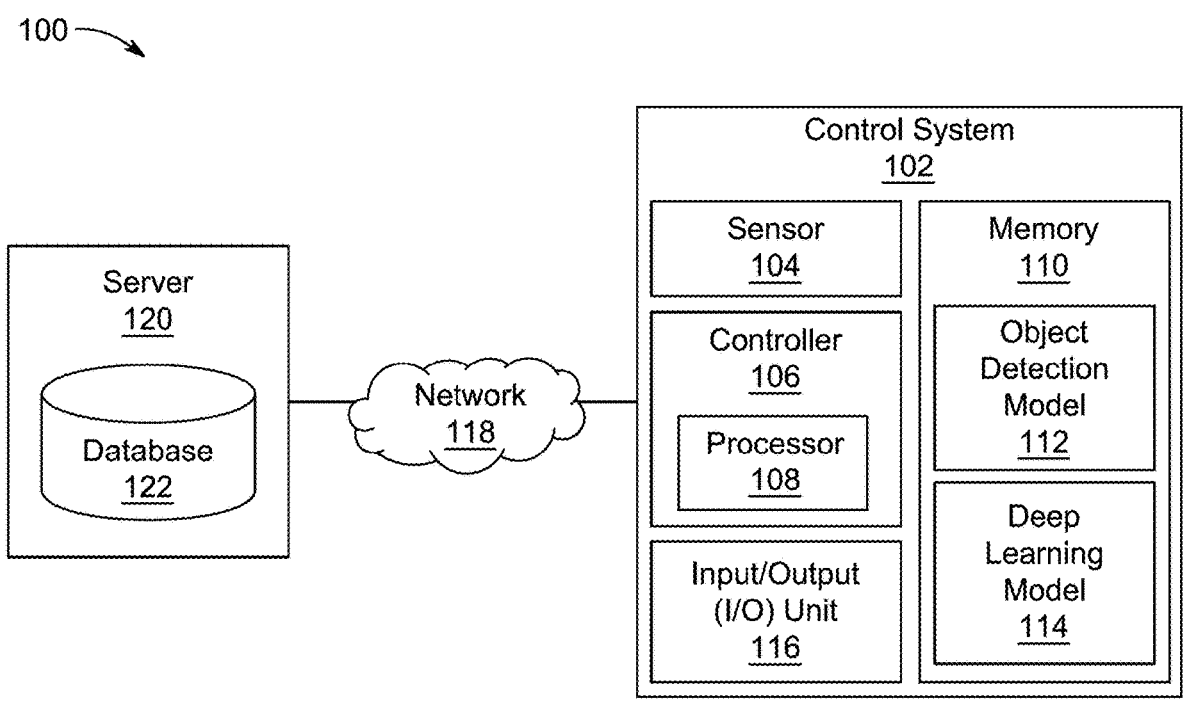
FIG. 1 is an exemplary block diagram of a control system configured for controlling an autonomous vehicle, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and a method of controlling an autonomous vehicle in an intersection. In order to control the autonomous vehicle, the method includes capturing, by at least one sensor, video data of an environment surrounding the autonomous vehicle. Upon capturing the video data, at least one pedestrian, at least one vehicle, and a traffic sign are detected using the captured video data and a trained object detection model. Further, a state of a traffic light is detected. Further, based on detecting the state, identifying whether the state is a flashing signal or regular cyclic state colors. Based on identifying the state, when the traffic light is in a normal (non-flashing, cyclic) state, a congestion at an intersection is analyzed. In addition, distance of the autonomous vehicle from nearby vehicles is calculated. Once the distance is calculated, the method includes determining whether there is sufficient green light time to safely cross the intersection without blocking traffic. Further, if the traffic light is flashing and the presence of at least one pedestrian is detected, a stop instruction is executed to stop motion of the autonomous vehicle. If no pedestrians are present, speed and distance of the nearby vehicles are measured. Further, based on the measured speed and distance, a movement of the autonomous vehicle is adjusted. In addition, if neither pedestrians nor vehicles are detected, the method includes changing the movement of the autonomous vehicle based on a detected traffic sign.

Referring now to FIG. 1, the present diagram provides an exemplary block diagram 100 of a control system 102 configured for controlling an autonomous vehicle, according to certain embodiments. In an embodiment, the control system 102 may also be referred to as an autonomous vehicle control system. The autonomous vehicle is a self-driving vehicle capable of sensing its surrounding environment and making driving decisions without human input. In one embodiment, the self-driving function can be invoked when the vehicle approaches an intersection. The autonomous vehicle uses a sensor suite configured with cameras, Radio Detection and Ranging (Radar), Light Detection and Ranging (LiDAR), and onboard computing to navigate, detect obstacles, and follow traffic rules autonomously. In an embodiment, examples of the autonomous vehicle may include a self-driving car, a self-driven delivery vehicle, a self-driven transport vehicle, and the like. In an embodiment, the control system 102 is integrated on, for example, an external surface of the autonomous vehicle. In some embodiments, some components of the control system 102 are integrated on the external surface of the autonomous vehicle, while other components may be integrated inside the autonomous vehicle.

In an embodiment, the control system 102 facilitates navigation of the autonomous vehicle by providing driver assistance functions such as path following, and obstacle avoidance. In order to control the autonomous vehicle, the control system 102 includes at least one sensor (e.g., a sensor 104). In an embodiment, the sensor 104 is provided to input sensor signals to the control system 102. In some embodiments, each of the at least one sensor is in communication with the control system 102 and is mounted at different places on the external surface of the autonomous vehicle as well as integrated within the autonomous vehicle. The sensor 104 is configured to capture video data of the environment surrounding the autonomous vehicle. Examples of the at least one sensor, i.e., the sensor 104 may include, but are not limited to, monocular cameras, stereo vision cameras, infrared night vision cameras, surround-view camera systems, and Red Green Blue-Depth (RGB-D) cameras. In some embodiments, the at least one camera may also include LiDAR sensors, Radar, ultrasonic sensors, Infrared (IR) sensors, speed sensors, and other distance sensors.

Further, the control system 102 includes a controller 106. In an embodiment, the controller 106 may be an integrated system or an Electronic Control Unit (ECU). The controller 106 further includes a processor 108. The processor 108 includes various circuitries, e.g., a traffic light state recognition circuitry, a vehicle electronic control circuitry, a surrounding scanning circuitry, and a traffic condition monitoring circuitry. In an embodiment, the surrounding scanning circuitry can include a multiple obstacle detector to detect objects (also referred to as obstacles), including pedestrians, vehicles, and traffic signs present in the surroundings of the autonomous vehicle. Further, traffic light state recognition circuitry includes a traffic light state recognizer model to detect the state of traffic lights, including detection of flashing signals. The various circuitries present within the processor 108 are configured to work in conjunction with a memory 110 to control the autonomous vehicle. The memory 110 is configured to store a trained object detection model, i.e., an object detection model 112, and a trained deep learning model, i.e., a deep learning model 114.

Additionally, the memory 110 is configured to store one or more computer-readable instructions or routines that, when executed, cause the control system 102 to control the autonomous vehicle. The memory 110 is configured to work in conjunction with the processor 108. In other words, the processor 108 is configured to execute the one or more computer-readable instructions or routines within the memory 110 to control the autonomous vehicle. The processor 108 may be implemented as one or more microprocessors, microcomputers, microcontrollers, Digital Signal Processors (DSPs), Central Processing Units (CPUs), logic circuitries, and/or any devices that process data based on operational instructions. Further, the memory 110 may be a volatile memory, such as a Random-Access Memory (RAM) or variations thereof, or a non-volatile memory such as a Read Only Memory (ROM), an Erasable Programmable Read Only Memory (EPROM), and a flash memory.

In an embodiment, once the video data is captured, the control system 102 is configured to detect a state of a traffic light, and identify whether the state is a flashing signal or regular steady state colors. In particular, the traffic light state recognition circuitry of the processor 108 may be configured to detect the state of the traffic light. The traffic light is a fixed and standardized visual signaling device configured to convey regulatory instructions, such as stop, prepare to proceed, or go, based on distinct traffic light colors, e.g., green, yellow, red, respectively. In an embodiment, the flashing signal refers to a traffic light emitting blinking signals (e.g., flashing red or flashing yellow) typically used to indicate caution, stop, or proceed with care at intersections or in abnormal traffic conditions. Further, the regular steady state colors refer to standard continuous signals, e.g., green, yellow, and red, that indicate go, prepare to stop, and stop, respectively, during normal cyclic traffic light operation.

Further, the control system 102 is configured to detect at least one pedestrian, at least one vehicle, and a traffic sign using the captured video data. In other words, the control system 102 is configured to detect the at least one pedestrian, the at least one vehicle, and the traffic sign present in the environment surrounding the autonomous vehicle. In particular, the surrounding scanning circuitry within the processor 108 of the control system 102 can detect the at least one pedestrian, the at least one vehicle, and the traffic sign using the object detection model 112 within the memory 110 of the control system 102. In an embodiment, the at least one pedestrian may correspond to any person (walking or standing) present within a vicinity of the autonomous vehicle, detected within the captured video data. The at least one vehicle may correspond to any motorized or non-motorized transport, e.g., cars, trucks, bicycles, etc., that are present within the vicinity of the autonomous vehicle. In an embodiment, the traffic sign is a mandatory stop sign, a reduce speed sign, and a proceed with caution sign. In some embodiments, the traffic sign includes, a speed limit indicator, a pedestrian crossing sign, directional signs indicating routes.

Object detection circuitry can include a vision system configured for object detection. One type of vision system is a Convolutional Neural Network (CNN). An object detection model 112 can be a CNN-based deep learning model, such as a You Only Look Once (YOLO) model, a Single Shot MultiBox Detector (SSD), or a faster Region-based CNN (R-CNN), and other CNN models.

Further, the control system 102 is configured to operate the traffic condition monitoring circuitry of the processor 108 when the traffic light is in a normal (non-flashing) state. In other words, the traffic condition monitoring circuitry is configured to operate when the state of the traffic light is detected to be a regular state color, i.e., a non-flashing state color, e.g., green light. In an embodiment, the traffic condition monitoring circuitry is configured to operate to analyze congestion at an intersection. The intersection refers to a point where two or more roads cross or meet, where vehicles, pedestrians, or other similar obstacles can change direction, merge, or cross paths. In other words, the traffic condition monitoring circuitry checks how busy or crowded the intersection is. Further, based on the analysis of the congestion at the intersection, the traffic condition monitoring circuitry is configured to calculate the distance of the autonomous vehicle from the nearby vehicles. Further, the traffic condition monitoring circuitry determines whether there is sufficient green light time to safely cross the intersection without blocking traffic.

In an embodiment, while detecting the green light time is sufficient, the control system 102 is configured to operate the surrounding scanning circuitry of the processor 108, the surrounding scanning circuitry of the processor 108 is configured to detect pedestrians, nearby vehicles using the captured video data and a trained deep learning model, i.e., the deep learning model 114. The deep learning model 114 is configured to detect and analyze multiple objects, including the pedestrians, the nearby vehicles, and their proximity in terms of speed and distance. Examples of the deep learning model 114 include, for example, the YOLO model, the faster R-CNN model, the SSD model, a ConvNet model, and any variation of CNN. In an embodiment, when a presence of the at least one pedestrian is detected, the control system 102 is configured to execute the vehicle control circuitry to execute a stop instruction to stop the autonomous vehicle. Further, the vehicle control circuitry is configured to measure the speed and distance of the nearby vehicles. Once the speed and the distance are measured, the vehicle control circuitry is configured to adjust the movement of the autonomous vehicle based on the measured speed and distance. In an embodiment, adjusting the movement of the autonomous vehicle includes actions such as accelerating, decelerating, or maintaining a safe following distance.

In an embodiment, the control system 102 is configured to operate the surrounding scanning circuitry of the processor 108 when the traffic light is flashing, the surrounding scanning circuitry of the processor 108 is configured to detect pedestrians, nearby vehicles, and traffic signs using the captured video data and a trained deep learning model, i.e., the deep learning model 114. The deep learning model 114 is configured to detect and analyze multiple objects, including the pedestrians, the nearby vehicles, and their proximity in terms of speed and distance. Examples of the deep learning model 114 include, for example, the YOLO model, the faster R-CNN model, the SSD model, a ConvNet model, and any variation of CNN. In an embodiment, when a presence of the at least one pedestrian is detected, the control system 102 is configured to execute the vehicle control circuitry to execute a stop instruction to stop the autonomous vehicle. Further, the vehicle control circuitry is configured to measure the speed and distance of the nearby vehicles. Once the speed and the distance are measured, the vehicle control circuitry is configured to adjust the movement of the autonomous vehicle based on the measured speed and distance. In an embodiment, adjusting the movement of the autonomous vehicle includes actions such as accelerating, decelerating, or maintaining a safe following distance. Further, the vehicle control circuitry is configured to change the movement of the autonomous vehicle based on the detected traffic sign. In other words, the vehicle control circuitry is configured to modify the movement of the autonomous vehicle, such as initiating a stop, adjusting speed, or changing direction, in response to the detected traffic sign. This method of performing the diagnostic assistance is further explained in detail in conjunction with FIG. 2-FIG. 10.

In an embodiment, the control system 102 may also include an Input/Output (I/O) unit 116. The I/O unit 116 may be used for user interaction with the autonomous vehicle, allowing a user (e.g., a driver or a passenger within the autonomous vehicle) to provide inputs such as a destination address, media preferences (e.g., music selection), or other operational commands to the control system 102. Additionally, the I/O unit 116 may be configured to display navigation updates, detected traffic conditions, object detection alerts, and other relevant information to the user. In an embodiment, the I/O unit 116 can be a display device having a touch screen display. The display device may also include various buttons and nobs located outside of the periphery of the display for inputting commands, such as volume adjustment, mode setting, and channel tuning.

In an embodiment, the control system 102 may be in communication with a server 120. Examples of the server 120 may include a laptop, a desktop, a tablet, and a cloud infrastructure. The control system 102 can communicate with the server 120 to access information stored within a database 122 of the server 120. The database 122 can include map data, real-time traffic updates, road network details, traffic sign and signal information, weather conditions, and historical driving data, which support route planning, environment perception, and decision-making processes of the autonomous vehicle. The control system 102 can communicate with the server 120 over a network 118. Examples of the network 118 may include, but are not limited to, a Wide Area Network (WAN), a Local Area Network (LAN), a wireless network, a mobile network, a Virtual Private Network (VPN), an internet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof.

Figure 2A:
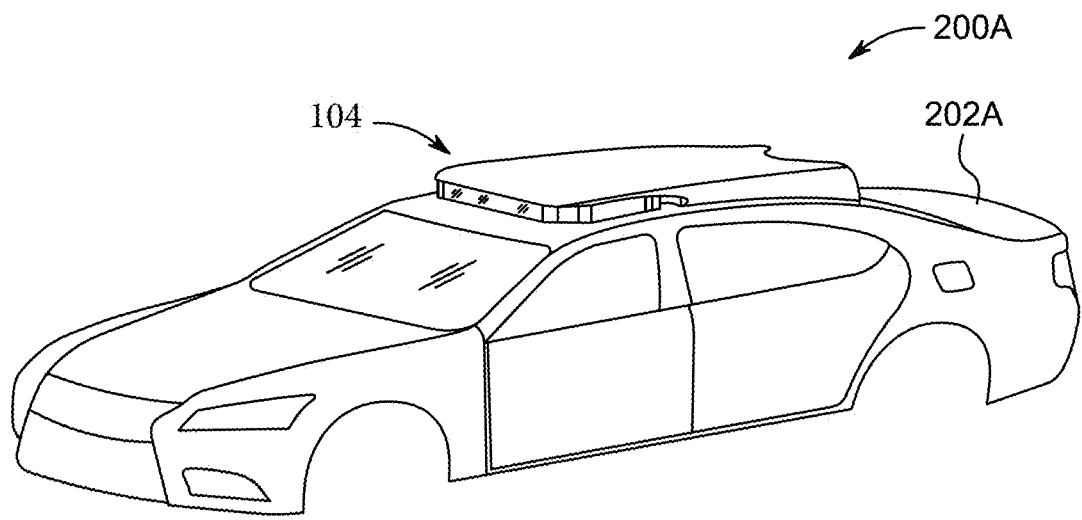
FIG. 2A is an exemplary pictorial depiction of the sensor suite integrated with the autonomous vehicle, according to certain embodiments.

Referring now to FIG. 2A, the present diagram provides an exemplary pictorial depiction 200A of the sensor suite 104 mounted to the autonomous vehicle, according to certain embodiments. As depicted in the FIG. 2A, the autonomous vehicle may correspond to an autonomous vehicle 202A. Further, as depicted in the exemplary embodiment of FIG. 2A, the sensor suite 104 may be mounted on a top outer surface of the autonomous vehicle. In other implementations, the sensor suite 104 may be mounted at other locations such as hood, back of car, or dispersed across various car surfaces. The sensor suite 104 is mounted on the top outer surface to facilitate an unobstructed field of view for the sensor 104 and allows optimal environmental scanning in all directions surrounding the vehicle. However, the placement of the sensor suite 104 on the top outer surface as depicted in FIG. 2A is merely illustrative and not limiting. In alternative embodiments, the sensor suite 104 may be located in other regions of the autonomous vehicle, such as a front grille, a rear bumper, side panels, or within the autonomous vehicle, depending on design and functional requirements. In some embodiments, some components (e.g., the sensor 104) of the control system 102 may be integrated on the external surface of the autonomous vehicle, while other remaining components (e.g., the controller 106) may be present inside the autonomous vehicle.

Figure 2B:
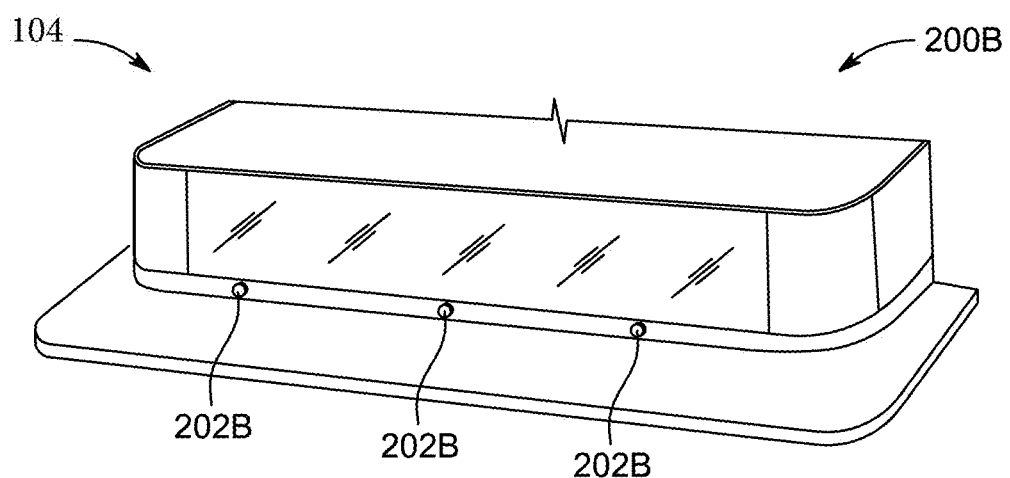
FIG. 2B is an exemplary pictorial depiction of the sensor suite, according to certain embodiments.

Referring now to FIG. 2B, the present diagram provides an exemplary pictorial depiction 200B of the sensor suite 104, according to certain embodiments. FIG. 2B is explained in conjunction with FIG. 2A. As depicted via the FIG. 2B, the sensor suite 104 on the top outer surface of the autonomous vehicle 202A may include several sensors 202B and the sensors may be of different types. For ease of representation, three such sensors are illustrated, although any number of sensors may be installed depending upon the implementation and functional requirements of the autonomous vehicle. The implementation requirements, for example, may be a vehicle size, sensor placement feasibility, manufacturing cost and complexity, maintenance and durability requirements. Further, the functional requirements may be, for example, an autonomous vehicle type (e.g., passenger car, autonomous delivery vehicles, heavy-duty trucks, etc.), operating environments (e.g., rural or off-road environments, urban area). The sensors 202B may correspond to the at least one sensor, i.e., the sensor 104. The sensors are configured to capture the video data of the environment surrounding the autonomous vehicle in real-time. Examples of the sensors include the monocular cameras, the stereo vision cameras, the infrared night vision cameras, the surround-view camera systems, the RGB-D cameras, the LiDAR sensors, the radar, the ultrasonic sensors, infrared sensors, speed sensors, and other vision sensors.

Figure 3:
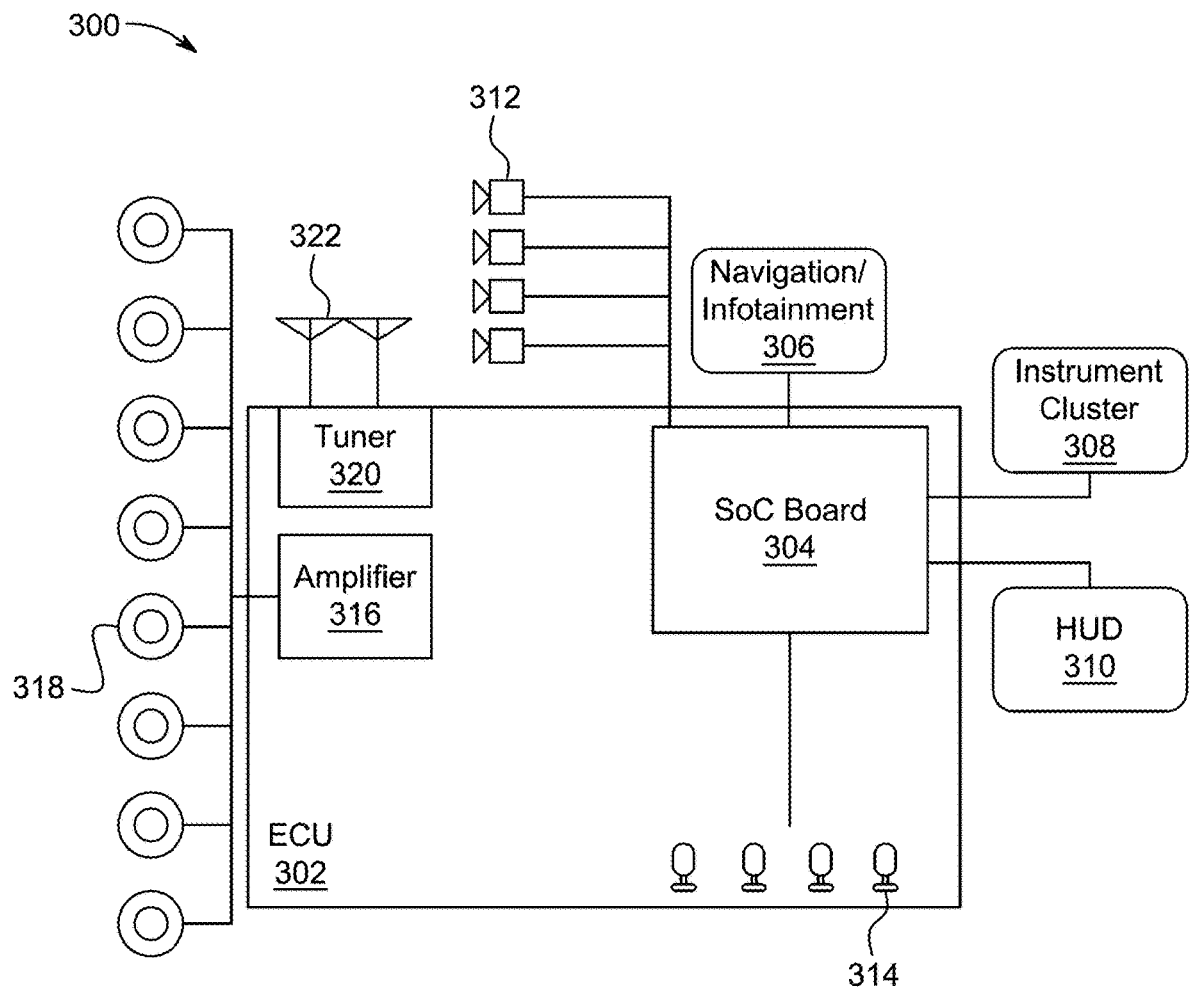
FIG. 3 is an exemplary diagram depicting an Electronic Control Unit (ECU) of the autonomous vehicle, according to certain embodiments.

Referring now to FIG. 3, the present diagram is a block diagram 300 depicting an ECU 302 of the autonomous vehicle 202A, according to certain embodiments. The ECU 302 is an embedded computing system configured to process sensor data, i.e., the captured video data and other vehicle sensor data, and execute control commands to manage various autonomous vehicle functions, including detecting objects (also referred to as the obstacles), planning movement, controlling vehicle movement. With reference to FIG. 1, the ECU 302 corresponds to the controller 106 of the control system 102. In that case ECU 302 acts as a central processing and management unit, used for coordinating communication between various components (e.g., the sensor 104, various electronic circuitries of the processor 108, the memory 110, etc.) of the control system 102.

The ECU 302 may include, for example, a System on Chip (SoC) board 304. In an embodiment, the SoC board 304 may correspond to the processor 108 that works in conjunction with the memory 110 to control the autonomous vehicle 202A. In particular, the SoC board 304 integrates the processor 108 and the memory 110, including the object detection model 112 and the deep learning models 114, on a single chip, enabling the ECU 302 to control the autonomous vehicle 202A. The SoC board 304 is configured to process the sensor data to detect objects, i.e., the at least one pedestrian, the at least one vehicle, and the traffic signal present within the vicinity of the autonomous vehicle 202A.

In an embodiment, the SoC board 304 is configured to communicate with a navigation/infotainment unit 306, an instrument cluster 308, a Head-Up-Display (HUD) 310, and speakers 312. The navigation/infotainment unit 306 provides the autonomous vehicle 202A with real-time maps, directions, and entertainment features. The navigation/infotainment unit 306 communicates with the SoC board 304 to process and display navigation data and provide voice guidance to help the autonomous vehicle 202A reach its destination while offering media and connectivity options to passengers. Further, the instrument cluster 308 displays critical vehicle information such as speed, battery status, fuel levels, warning indicators, as well as Advanced Driver Assistance Systems (ADAS) mode status. The instrument cluster 308 receives data from the SoC board 304 to update the occupant of the autonomous vehicle 202A on vehicle performance and operational conditions. The performance and operational conditions (e.g., battery health, a current speed, etc.) refer to the current status of the autonomous vehicle 202A and how well the autonomous vehicle 202A is performing during its operation.

The HUD 310 renders key information like speed (speed limit-kilometers per hour (kmph) or miles per hour (mph)), navigation instructions (e.g., the stop instruction), and safety alerts (e.g., pedestrian detected, collision warning, etc.) onto windshield the autonomous vehicle 202A within a line of sight of the occupant, allowing the occupant to view the key information without taking their eyes off the road. The SoC board 304 processes this key information and sends it to the HUD 310 for display in real time. Further, the speakers 312 are used for providing audio feedback, such as navigation prompts, vehicle alerts (e.g., low fuel warning, tire pressure warning, etc.), entertainment content, or voice-based responses, to the occupant of the autonomous vehicle 202A. The SoC board 304 communicates with the speakers 312 to deliver audio cues (i.e., the navigation prompts, the vehicle alerts, the safety alerts, etc.) and system notifications, enhancing the driving or passenger experience.

In an embodiment, the ECU 302 may further include a set of microphones (e.g., a microphone 314). The microphone 314 functions as an audio input device that captures voice commands, in-cabin conversations, and ambient sounds. The microphone 314 enables hands-free interaction, noise cancellation, and an enhanced in-cabin user experience. In an embodiment, the microphone 314 is connected to the SoC board 304. The SoC board 304 is configured to receive audio signals, such as voice commands or ambient sounds, from the microphone 314 for processing.

The ECU 302 further includes an amplifier 316. The amplifier 316 is connected to a set of sensors 318 (i.e., the at least one sensor). The set of sensors 318 includes various sensors (such as cameras, LIDAR, radar, ultrasonic sensors) that capture video data about the environment surrounding the autonomous vehicle 202A. Each sensor in the set of sensors 318 detects obstacles, pedestrians, other vehicles, traffic signals and signs, and more, providing real-time input to the ECU 302 to enable autonomous navigation and safety functions. Further, the amplifier 316 is configured to boost the captured video data received as electrical signals from the sensor set 318 to a higher voltage or power level, ensuring that the captured video data is strong enough for processing by the ECU 302. The amplifier 316 enhances the signal strength and quality of electrical signals for accurate sensor readings, which are crucial during real-time decision-making by the autonomous vehicle 202A.

The ECU 302 further includes a tuner of 320. The tuner 320 is connected to antenna 322. The antenna 322 receives electromagnetic signals, such as Global Positioning System (GPS) signals, radio signals, or communication signals, from external sources. The antenna 322 transmits these electromagnetic signals to the tuner 320, allowing the autonomous vehicle 202A to access real-time information for navigation, traffic updates, and communication with other vehicles or infrastructure. The tuner 320 selects an appropriate frequency or channel to provide data to the ECU 302 for navigation, infotainment, or communication with external systems, e.g., GPS satellite, cellular networks.

Figure 4:
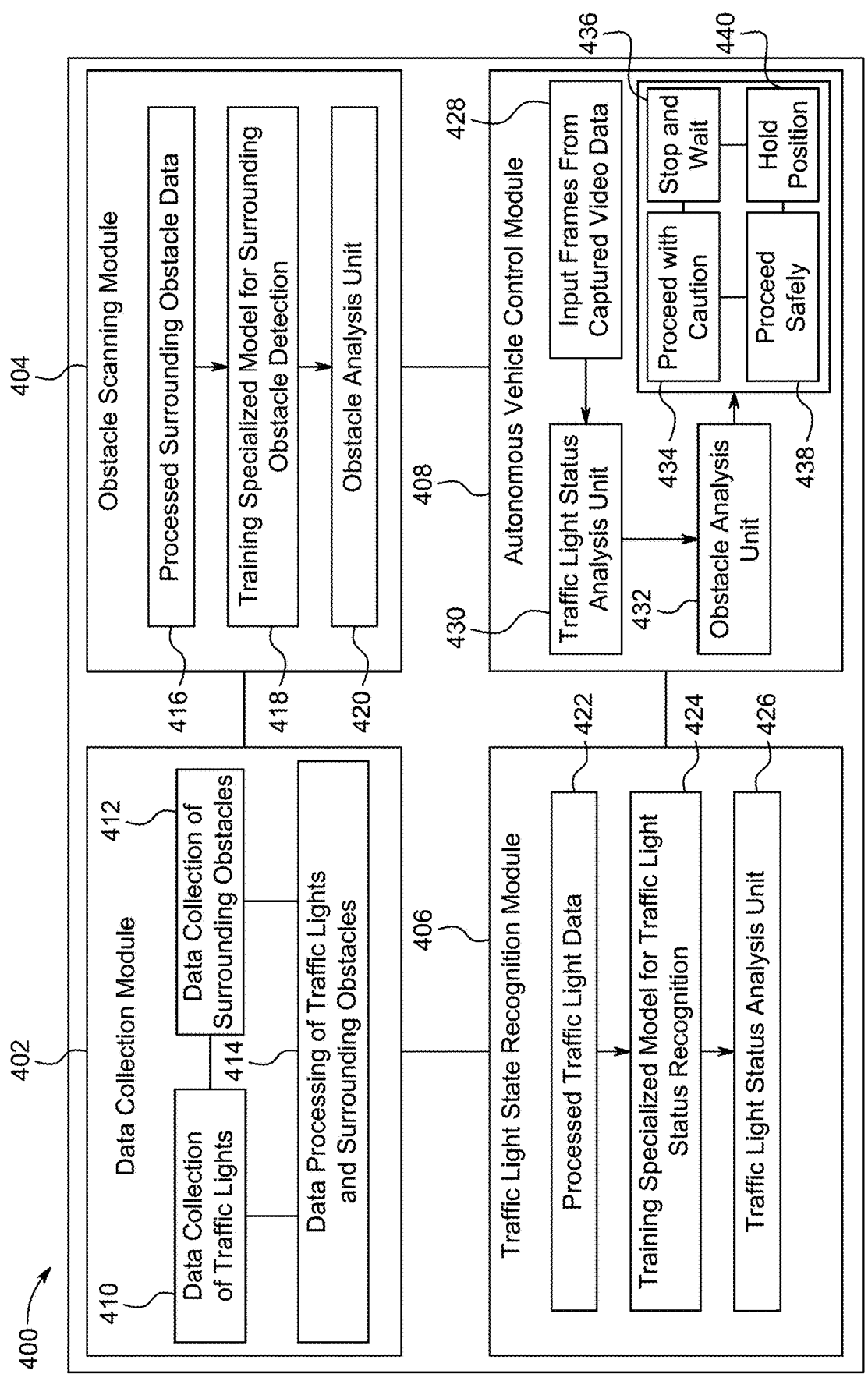
FIG. 4 is an exemplary process flow diagram depicting various modules associated with the control system configured for controlling the autonomous vehicle, according to certain embodiments.

Referring now to FIG. 4, the present diagram is an exemplary system diagram 400 depicting various modules associated with the control system 102 configured for controlling the autonomous vehicle 202A, according to certain embodiments. The modules associated with the control system 102 can be implemented as software executed in a hardware processor, or may be firmware, or a combination of software and firmware. In one embodiment, the one or more of the modules may be implemented in a cloud service, or in a fog network associated with a cloud service. As depicted via the exemplary system diagram 400, the various modules associated with the control system 102 include a data collection module 402, an obstacle scanning module 404, a traffic light recognition module 406, and an autonomous vehicle 202A control module 408. In addition, the control system 102 may also include a traffic condition monitoring module (not shown). In an embodiment, the data collection module 402, the obstacle scanning module 404, the traffic light state recognition module 406, the autonomous vehicle 202A control module 408, and the traffic condition monitoring module may be in communication with each other.

The data collection module 402 is connected with the at least one sensor that is configured to capture the video data corresponding to the environment surrounding the autonomous vehicle 202A. In particular, at step 410, the data collection module 402 is configured to collect data on traffic lights (also referred to as traffic signals) present within the environment surrounding the autonomous vehicle 202A from the video data captured using the at least one sensor (e.g., the sensor 104). In an embodiment, the data collected on the traffic lights can include a current state (e.g., green, yellow, red, or flashing) and timing patterns (e.g., duration of each light cycle) of each traffic light. Further, at step 412, the data collection module 402 is configured to collect data of surrounding obstacles present within the vicinity of the autonomous vehicle 202A. The surrounding obstacles may include, for example, the at least one pedestrian, the nearby vehicles, and other moving objects. Further, at step 414, the data collection module 402 is configured to process the data associated with the traffic lights and the data associated with the surrounding obstacles to generate processed data for further analysis. For example, the data collection module 402 employs one or more data processing techniques (e.g., a gaussian blur, a median filtering, moving averages and exponential smoothing, etc.) to filter noise and erroneous frames from the data collected at step 410 and step 412.

At step 416, the obstacle scanning module 404 is configured to process the data associated with the surrounding obstacles (also referred to as the objects) present within the vicinity of the autonomous vehicle 202A. In an embodiment, the obstacle scanning module 404 corresponds to the surrounding scanning circuitry of the control system 102. The obstacle scanning module 404 is configured to process the data associated with the surrounding obstacles to identify one or more obstacles (e.g., a pedestrian, a vehicle, a traffic sign, an animal, a construction zone, or other moving object) present in the environment surrounding the autonomous vehicle 202A. In an embodiment, the obstacle scanning module 404 can identify the one or more obstacles using the trained object detection model, i.e., the object detection model 112. Further, at step 418, the obstacle scanning module 404 is configured to train the object detection model 112 based on the detected one or more obstacles. In an embodiment, the object detection model 112 can be iteratively trained based on the one or more obstacles detected at each cycle. Provided a trained object detection model 112, at step 420, the data associated with the surrounding obstacles is provided to an obstacle analysis unit to detect the one or more obstacles present in the environment surrounding the autonomous vehicle 202A. In an embodiment, the obstacle analysis unit corresponds to the multiple obstacle detector configured to detect various obstacles present within the vicinity of the autonomous vehicle 202A.

At step 422, the traffic light state recognition module 406 is configured to process the data associated with the traffic lights present within the environment surrounding the autonomous vehicle 202A. In an embodiment, the traffic light state recognition module 406 corresponds to the traffic light state recognition circuitry of the control system 102. The traffic light state recognition module 406 is configured to extract relevant patterns from the data of the traffic lights, such as the current state, i.e., the flashing signal or the regular state colors, a current color, e.g., red, yellow, and green, and transition timing associated with the traffic lights detected within the vicinity of the autonomous vehicle 202A. Further, at step 424, the traffic light state recognition module 406 is configured to train a traffic light state recognizer model based on the extracted relevant patterns from the data associated with the traffic lights. In an embodiment, the traffic light state recognizer model corresponds to a deep learning model (e.g., the deep learning model 114). The traffic light state recognizer model can be iteratively trained based on the extracted relevant patterns during each cycle to update the traffic light state recognizer model based on any new pattern detected in the data collected at each cycle. Further, at step 426, the extracted relevant patterns are used by the traffic light state recognizer model (i.e., a traffic light status analysis unit) to detect the current state of traffic lights in real-time.

At step 428, the autonomous vehicle 202A control module 408 is configured to receive input data frames, including frames associated with the data of the surrounding obstacles and the data of the traffic lights. In an embodiment, the autonomous vehicle 202A control module 408 corresponds to the vehicle control circuitry of the control system 102. The input data frames are processed to extract real-time information regarding the environment surrounding the autonomous vehicle 202A. At step 430, the traffic light status analysis unit utilizes the input data frames to determine the current state of traffic lights, including distinguishing between the flashing signal and the regular cyclic color states (i.e., red/yellow/green). Further, at step 432, the obstacle analysis unit analyzes the data of the surrounding obstacles to detect the one or more obstacles within the vicinity of the autonomous vehicle 202A.

In an embodiment, based on the analysis performed at step 430 and step 432, the autonomous vehicle control module 408 is configured to determine an appropriate navigation behavior for the autonomous vehicle 202A. For example, at step 434, the autonomous vehicle control module 408 can initiate a proceed-with-caution instruction when low traffic density or cautionary signs are detected, ensuring safe navigation through potentially uncertain environments. At step 436, the autonomous vehicle control module 408 can execute a stop-and-wait instruction (also referred to as the stop instruction) when a pedestrian or another obstacle (e.g., the traffic sign with the regular state color, e.g., red or flashing state) is detected in the path of the autonomous vehicle 202A. At step 438, when no obstacles are present, congestion is low, and the state of the traffic light is a regular steady state color, e.g., the green light, the autonomous vehicle control module 408 can initiate a proceed safely instruction for the autonomous vehicle 202A to enable the movement of the autonomous vehicle 202A through the intersection. Additionally, at step 440, a hold position instruction can be initiated by the autonomous vehicle control module 408, particularly when the flashing signal for the traffic light is detected, or the intersection is blocked. In an embodiment, the appropriate navigation behavior for the autonomous vehicle 202A is be determined based on operations performed by the traffic condition monitoring module. In an embodiment, the traffic condition monitoring module corresponds to the traffic condition monitoring circuitry. The operations performed by the traffic condition monitoring module may include, for example, analyzing congestion at the intersection, calculating distance from nearby vehicles, determining whether there is sufficient green light time to safely cross the intersection without blocking traffic, and other safe movement assessments.

Figure 5:
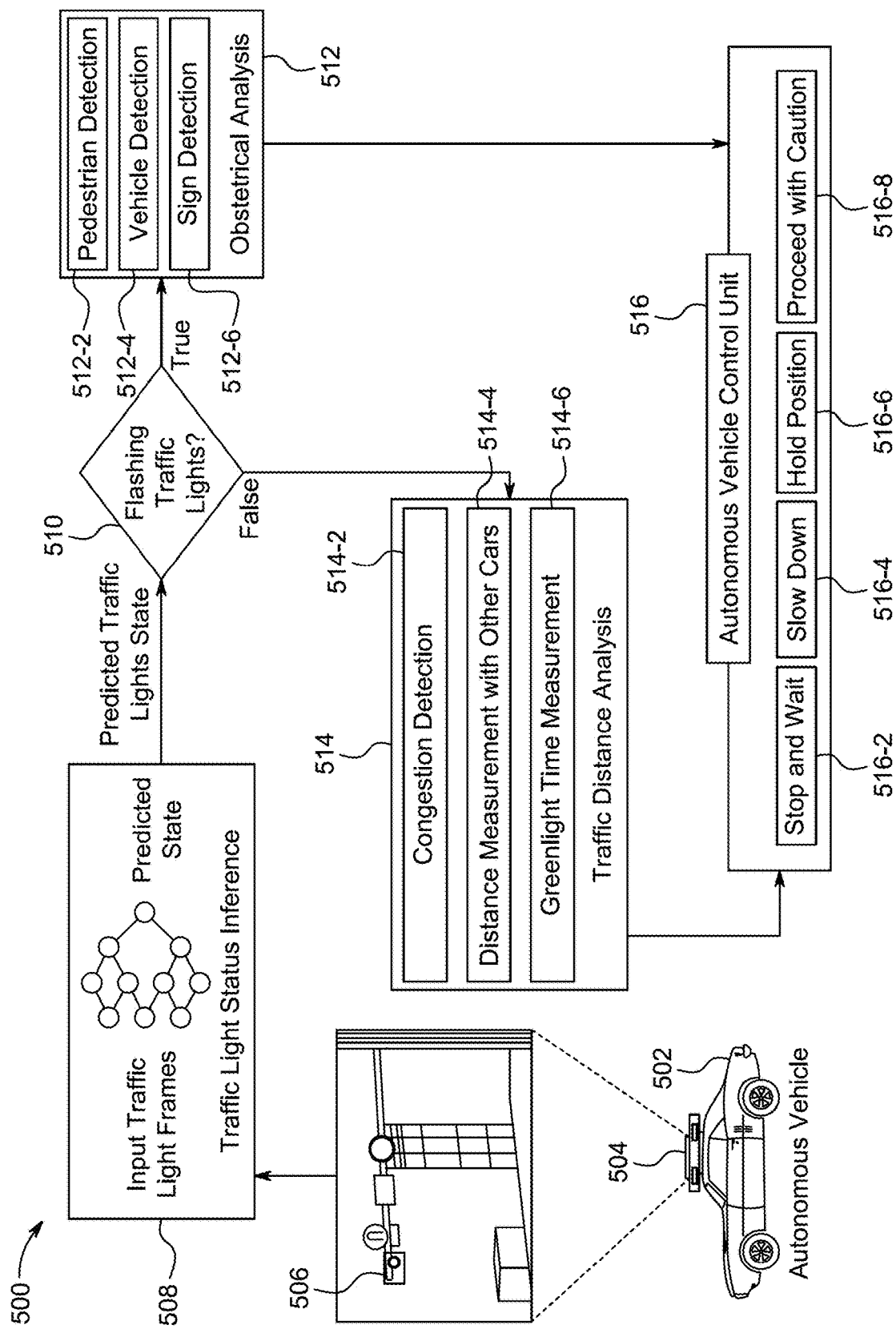
FIG. 5 is an exemplary functional diagram depicting a comprehensive architecture of the control system for the autonomous vehicle, according to certain embodiments.

Referring now to FIG. 5, the present diagram provides an exemplary functional diagram 500 depicting a comprehensive architecture of a control system for the autonomous vehicle 202A, according to certain embodiments. The exemplary functional diagram 500 depicts an autonomous vehicle 502 equipped with a sensor suite 504 mounted on the top outer surface of the autonomous vehicle 502. With reference to FIG. 2A, the autonomous vehicle 502 corresponds to the autonomous vehicle 202A. Further, the control system corresponds to the control system 102. Additionally, the exemplary functional diagram 500 depicts an exemplary video having a sequence of image frames 506 having a traffic signal with the state as the regular steady color state, e.g., the green light. Initially, the sensor suite 504 of the autonomous vehicle 502 is configured to capture video data corresponding to the environment (depicted via the exemplary image frames 506) surrounding the autonomous vehicle 502, including a traffic signal. Although the example image 506 shows a single signal light, it should be understood that an intersection may include more than one signal light, for example, one signal light for each road lane.

Upon capturing the video data, at step 508, a traffic light status inference is performed. With reference to FIG. 4, the traffic light status inference can be performed by the traffic light state recognition module 406 using the traffic light state recognizer model. In particular, the traffic light status inference can be performed by the traffic light state recognition circuitry to predict the current state of a traffic light, which includes identifying whether the current state is a flashing signal or a regular steady state color. In an embodiment, an input to the traffic light state recognizer model receives as input a sequence of image frames including the traffic light obtained from the captured video data. Further, an output of the traffic light state recognizer model is the predicted current state. For example, the predicted current state may be a green color steady state based on a sequence of image frames in which the traffic light remains a steady green color for a certain time period. Since the traffic light state recognition circuitry predicts the current state of a traffic light from a vehicle 502, a steady state light can have been in a certain color for a time period before the sensor 504 begins to capture video that includes the traffic light. In the case of a cyclic light pattern, the light color will switch to yellow after the remaining time for the green light. subsequently, at step 510, a check is performed to determine whether the current state determined for the traffic light is the flashing signal or a regular steady state color. The video captured by sensor 504 will include intermitted flashes of light of a same color over an extended period of time depicting a flashing signal. The video captured by sensor 504 will include a steady light of a same color then switching to another light color, in a cyclic pattern. In one embodiment, based on the check performed at step 510, when the current state determined for the traffic light is the flashing signal, at step 512, obstacle analysis is performed. The obstacle analysis is performed by the obstacle scanning module 404 having the multiple obstacle detector. In particular, the surrounding scanning circuitry performs the obstacle analysis using the trained object detection model to detect the at least one pedestrian, the at least one vehicle, and the traffic sign as mentioned in step 512-2, step 512-4, and step 512-6, respectively.

Once the obstacle analysis is performed at step 512, at step 516, an autonomous vehicle control unit (same as the autonomous vehicle control module 408) is configured to determine the appropriate navigation behavior for the autonomous vehicle. The autonomous vehicle control unit corresponds to the vehicle control circuitry. In this embodiment, at step 516-2, the autonomous vehicle control unit can initiate the stop and wait instruction if the at least one pedestrian or the at least one vehicle is detected at the intersection. Further, a slowdown instruction is generated when a speed-reducing sign is detected, as depicted in step 516-4. Further, at step 516-8, the hold position instruction is generated when traffic congestion is detected at the intersection. In an embodiment, traffic congestion refers to a density of vehicles above a predetermined limit that prevents vehicle movement at a certain speed. For example, a condition in which the density of vehicles at an intersection hinders movement of the vehicles safely through the intersection would be considered traffic congestion. Further, at step 516-8, the autonomous vehicle control unit can generate the proceed with caution instruction if low traffic congestion is detected at the intersection. In an embodiment, low traffic congestion relates to a condition in which the density of vehicles at the intersection is greater than a predetermined density but the vehicles can safely move through the intersection. The conditions for congested traffic and low traffic congestion can be set for certain types of intersections based on experimentation. Types of intersections can include intersections defined by the number of lanes in roads leading to the intersection.

In another embodiment, based on the check performed at step 510, when the current state determined for the traffic light is the regular steady state color, at step 514, traffic distance analysis is performed. In order to perform the traffic distance analysis, at step 514-2, congestion at the intersection is detected. In an embodiment, the traffic distance analysis may be performed by the traffic condition monitoring circuitry using the trained deep learning model, e.g., the deep learning model 114. Further, at step 514-4, the distance of the autonomous vehicle from the nearby vehicles is determined. In addition, at step 514-6, the green light time is measured to determine whether there is sufficient green light time to safely cross the intersection without blocking traffic. Once the traffic distance analysis is performed at step

514, at step 516, the autonomous vehicle control unit may be configured to determine the appropriate navigation behavior for the autonomous vehicle. In this embodiment, at step 516-2, the autonomous vehicle control unit may initiate the stop and wait instruction if the traffic light is red or if the measured green light time is insufficient to safely pass the intersection. Further, at step 516-4, the slow down instruction is generated when the measured distance between the autonomous vehicle and any nearby vehicle is below a safe threshold (e.g., 3 meters). At step 516-6, the hold position instruction is generated when congestion is detected at the intersection. Further, at step 516-8, the autonomous vehicle control unit may generate the proceed with caution instruction when the green light is on, and the congestion is low enough to ensure safe passage through the intersection.

Figure 6:
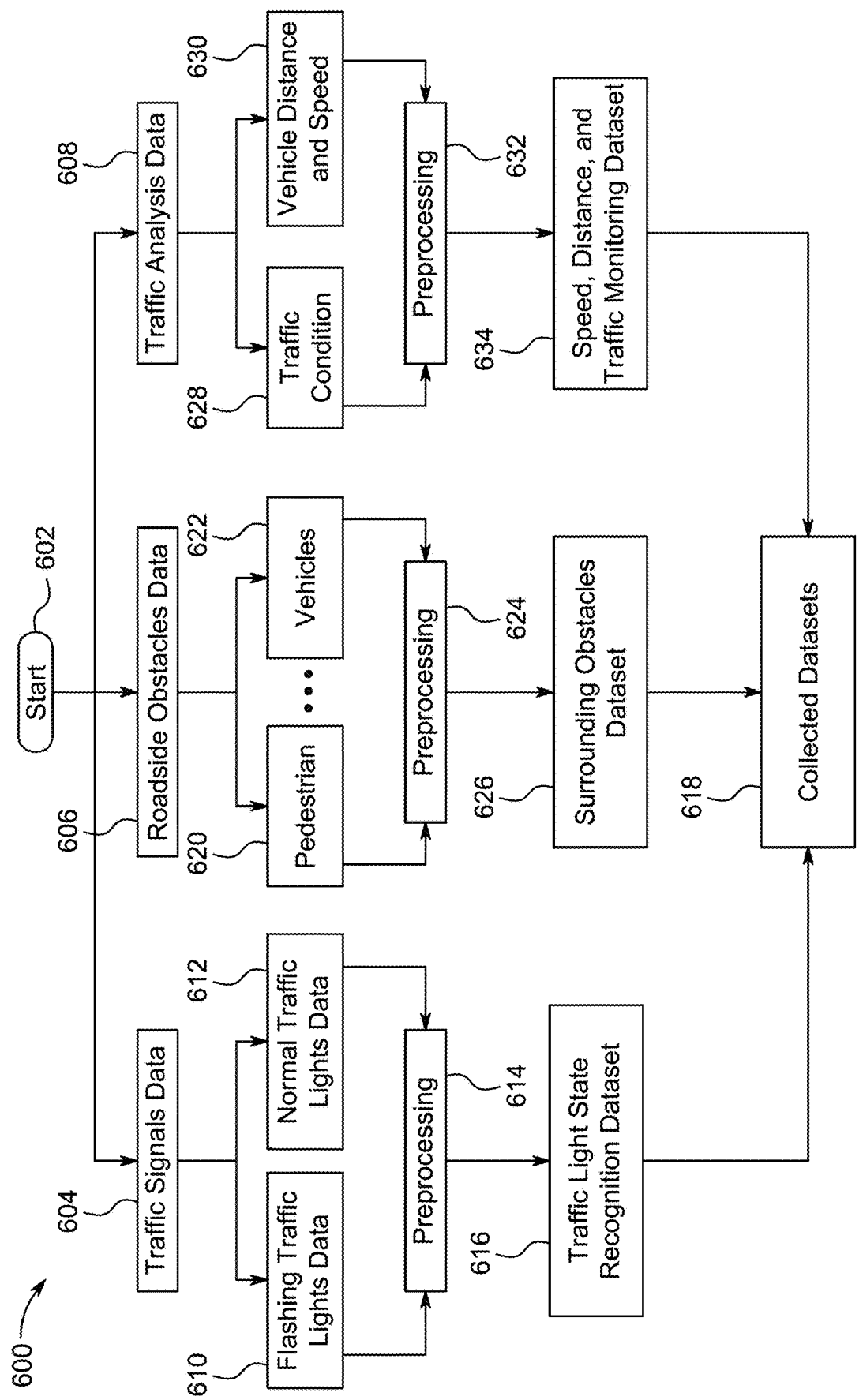
FIG. 6 is an exemplary flow diagram depicting a flowchart of dataset creation by the control system for navigating the autonomous vehicle, according to certain embodiments.

Referring now to FIG. 6, the present diagram provides an exemplary flow diagram 600 depicting a flowchart of dataset creation by the control system 102 for navigating the autonomous vehicle, according to certain embodiments. With reference to FIG. 4, each step of the flow diagram 600 may be performed by the data collection module 402 using the at least one sensor. At step 602, a process of creating the dataset starts. Initially, at step 604, traffic light data is collected from real-world observations of traffic light signals relevant to autonomous driving decisions. For example, the traffic light data may include visual input of traffic lights under various conditions, such as regular green/yellow/red state colors cycles and flashing state colors cycles. Further, at step 604, roadside obstacles data related to objects detected in the autonomous vehicle's environment is collected. The roadside obstacles data may include, for example, data of dynamic and static objects like pedestrians, vehicles, animals, traffic signs, and other objects, in the vicinity of the autonomous vehicle. Further, at step 606, traffic analysis data associated with traffic flow and operational planning is collected. The traffic analysis data may include, for example, data associated with traffic conditions, vehicle speed, and inter-vehicle distance.

The traffic signal data collected at step 604 is divided into two sets, i.e., a flashing traffic light data and a normal cyclic traffic light data, as depicted via step 610 and step 612, respectively. In an embodiment, the flashing traffic light data includes images of blinking or cautionary traffic lights under various environmental conditions, such as sunny, foggy, stormy, etc., while the normal traffic light data includes regular green, yellow, and red traffic light cyclic sequences captured under various environmental conditions. Further, at step 614, the flashing traffic light data and the regular traffic light data are preprocessed, e.g., cleaned, labeled, normalized, using one or more data preprocessing techniques. Examples of the one or more data preprocessing techniques may include an image normalization technique, a data augmentation technique, a noise filtering technique, and other signal processing. Once the flashing traffic light data and the normal traffic light data are preprocessed, at step 616, a traffic light state recognition dataset is generated.

The roadside obstacles data collected at step 606 is divided into different sets, including pedestrian data and nearby vehicle data as depicted via steps 620 and 622, respectively. Other sets may include data associated with traffic signs, road conditions, construction zones, and other road-related markings. In an embodiment, the pedestrian data includes visual and spatial information related to individuals near the autonomous vehicle, such as a position, a posture, and a movement direction of the individual, while the nearby vehicle data includes information on adjacent vehicles, such as type, speed, relative distance, and trajectory. Further, at step 624, the pedestrian data and the nearby vehicle data are preprocessed using one or more data preprocessing techniques, such as the noise filtering technique, an object classification technique, a bounding box annotation technique, and the like. Once the pedestrian data and the nearby vehicle data are preprocessed, at step 626, a surrounding obstacles dataset is generated.

The traffic analysis data collected at step 608 is divided into two sets, i.e., traffic condition data, and vehicle distance and speed data, as depicted via step 628 and step 630, respectively. In an embodiment, the traffic condition data includes metrics such as traffic congestion levels, traffic density, and flow patterns, while the vehicle distance and speed data include measurements of relative vehicle motion, inter-vehicle spacing, and speed variations in dynamic environments. Further, at step 632, the traffic condition data, and the vehicle distance and speed data are preprocessed using one or more data preprocessing techniques. Examples of the one or more data preprocessing techniques include time-series normalization, outlier filtering, pattern recognition-based segmentation. Once the traffic condition data and the vehicle distance and speed data are preprocessed, at step 634, a speed, distance, and traffic monitoring dataset is generated.

Further, at step 618, the traffic light state recognition dataset (from step 616), the surrounding obstacles dataset (from step 626), and the speed, distance, traffic monitoring dataset (from step 634) are aggregated to generate a unified dataset depicted as collected datasets. The unified dataset generated is used to train one or more machine learning models, such as the object detection model 112 and the deep learning model 114. In some embodiments, the unified data generated is likely to be used for further analysis in traffic management, autonomous driving systems, or predictive traffic control, helping improve road safety and efficiency.

Figure 7A:
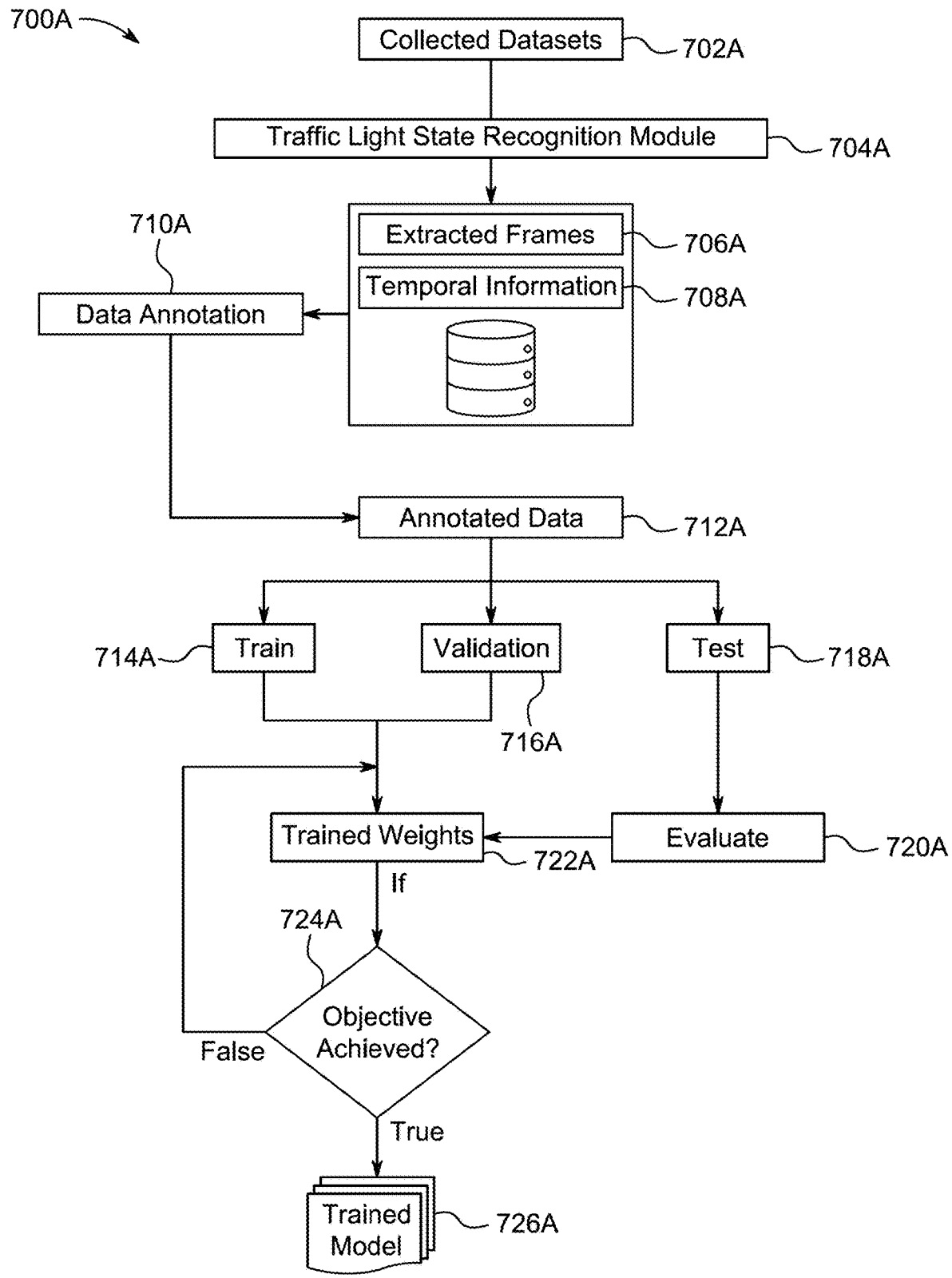
FIG. 7A is an exemplary diagram depicting a process flow for training and evaluating models within the control system based on traffic light states, according to certain embodiments.

Referring now to FIG. 7A, the present diagram provides an exemplary diagram depicting a process flow 700A for training and evaluating models within the control system 102 based on traffic light states, according to certain embodiments. At step 704A, a traffic light state recognition module (i.e., the traffic light state recognition module 406) uses the collected dataset depicted via step 702A. The collected datasets depicted via the step 702A, may correspond to the collected datasets at step 618. In particular, the traffic light state recognition module 406 uses the traffic light state recognition dataset from the collected dataset to train and validate a deep learning model (e.g., the traffic light states recognizer model). Initially, the traffic light state recognition module 406 is configured to extract frames and derive associated temporal information from the traffic light state recognition dataset (e.g., flashing vs. regular traffic lights under varying environmental conditions) as mentioned in step 706A and step 708A, respectively. As discussed above, a flashing light will be captured by sensor 504 as a sequence of frames in which a same color appears as an intermittent flash over a period of time. A regular traffic signal will cycle through lights of different colors, where each color appears as a steady signal for a period of time. The period of time that a signal is of a same color is dependent on the traffic signal timing pattern that is establish by a traffic light controller. Further, at step 710A, data annotation is performed on the extracted frames to label the traffic light states, e.g., a green color state, a yellow color state, a red color state, a flashing state, and cyclic states at various cycle lengths, based on timing patterns, to generate annotated data as depicted via step 712A.

Once the annotated data is generated, the annotated data is divided into a training dataset, a validation dataset, and a test dataset, as depicted via step 714A, step 716A, and step 718A, respectively. The training dataset is used to train the traffic light states recognizer model to detect the state of the traffic light in real-time during the operation of the autonomous vehicle. The validation dataset is used to tune the traffic light states recognizer model and monitor the performance of the traffic light states recognizer model. The validation dataset is used to evaluate how well the traffic light states recognizer model generalizes to unseen data before testing it on the test dataset. Further, based on the training and validation process performed for the traffic light states recognizer model, at step 722A, trained weights are generated. The trained weights are generated during the training and validation process based on accurate mapping of an input, e.g., images of traffic lights, to a correct output, e.g., an image with green traffic light color, an image with yellow traffic light color, and an image with a red traffic light color. At step 720A, the traffic light state recognizer model is further evaluated based on the test dataset. Further, based on the evaluation, the trained weights generated for the traffic light states recognizer model are re-adjusted. At step 724A, a performance check is done to determine if a training objective (e.g., an accuracy or a precision threshold of the traffic light states recognizer model) is achieved or not. The precision threshold refers to a predefined minimum level of accuracy that the traffic light states recognizer model must achieve. In one embodiment, when the training objective is not achieved, step 722A is re-executed. In another embodiment, when the training objective is achieved, at step 726A, the trained traffic light state recognizer model is used during real-time navigation to detect the state of traffic light. Provided the traffic light state recognition dataset (e.g., flashing vs. regular traffic lights), the traffic light state recognizer model is configured to distinguish between a flashing state and a regular cyclic light pattern.

Figure 7B:
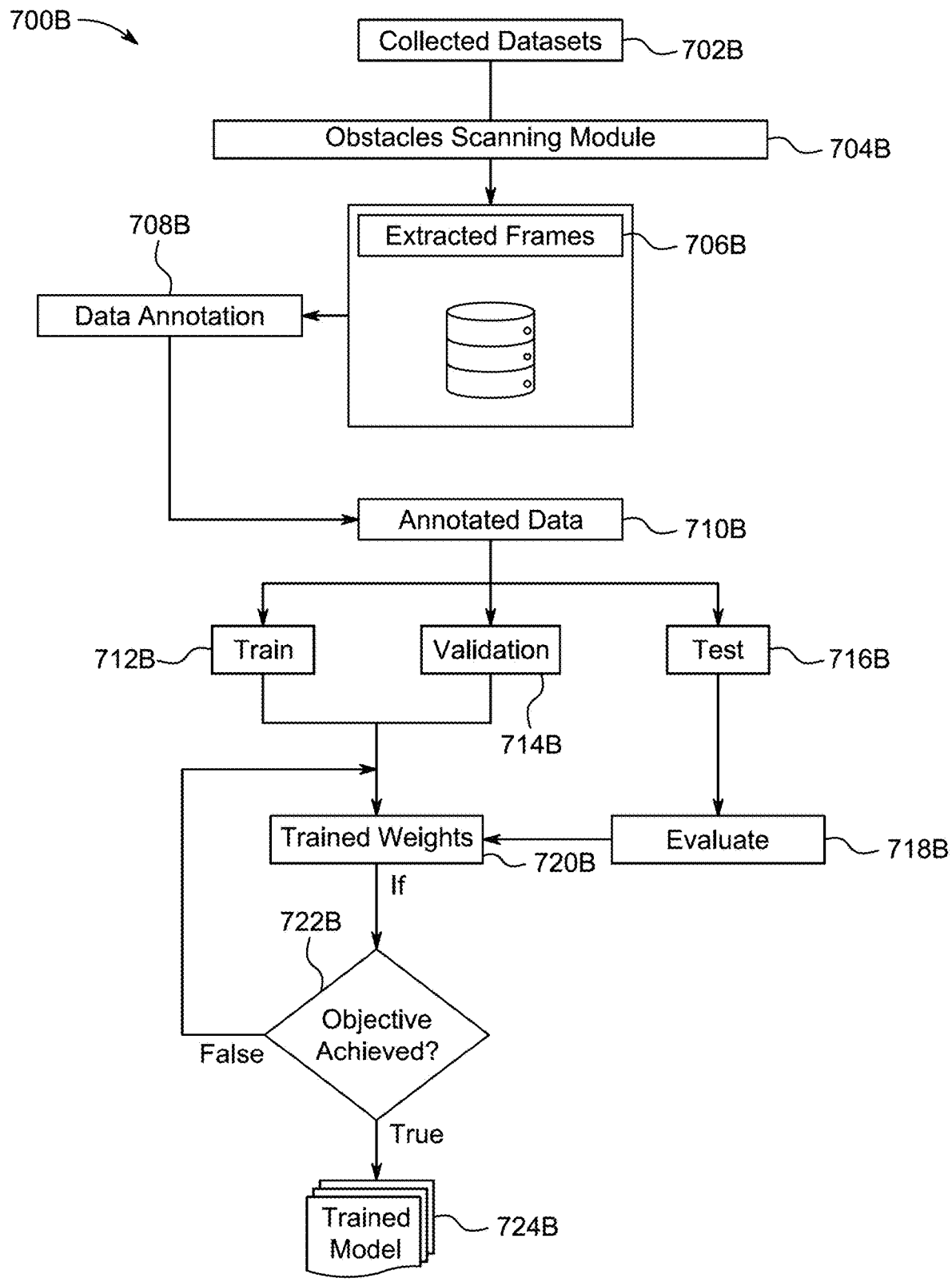
FIG. 7B is an exemplary diagram depicting a process flow for training and evaluating models within the control system based on obstacles in the surrounding environment, according to certain embodiments.

Referring now to FIG. 7B, the present diagram provides an exemplary diagram depicting a process flow 700B for training and evaluating models within the control system 102 based on obstacles in the surrounding environment, according to certain embodiments. At step 704B, an obstacle scanning module (e.g., the obstacle scanning module 404) uses the collected datasets depicted via step 702B. The collected datasets depicted via step 702B may correspond to the collected datasets at step 618. In particular, the obstacle scanning module 404 uses the surrounding obstacles dataset (e.g., data including images or video of pedestrians, nearby vehicles, and other objects) from the collected dataset to train and validate an object detection model, i.e., the object detection model 112. Initially, at step 706B, the obstacle scanning module 404 is configured to extract individual frames from the surrounding obstacles dataset. These frames include visual inputs of dynamic and static obstacles such as pedestrians crossing a road, nearby vehicles, traffic signs, cyclists, and other road users. Further, at step 708B, the data annotation is performed on the extracted frames to label obstacles, e.g., a pedestrian, an animal, a traffic sign, a vehicle, a road barrier, and other objects, to generate annotated data as depicted via step 710B.

Once the annotated data is generated, the annotated data is divided into a train dataset, a validation dataset, and a test dataset, as depicted via steps 712B, 714B, and 716B, respectively. The train dataset is used to train the object detection model to recognize and classify different types of road-related obstacles. The validation dataset is used to tune and monitor the object detection model's performance, ensuring the object detection model generalizes well to unseen obstacle data before being evaluated using the test dataset. Further, based on the training and validation process performed for the object detection model, at step 720B, trained weights are generated. The trained weights are generated during the training and validation process based on accurate mapping of an input, e.g., images of obstacles, to a correct output, e.g., an image with a pedestrian, an image with a vehicle, and images of other road environment conditions. At step 718B, the object detection model is further evaluated based on the test dataset. Further, based on the evaluation, the trained weights generated for the object detection model are adjusted. At step 722B, a performance check is done to determine if the training objective (e.g., an accuracy or a precision threshold of the object detection model) is achieved or not. In one embodiment, when the training objective is not achieved, step 720B is re-executed. In another embodiment, when the training objective is achieved, at step 724B, the trained object detection model is used during real-time navigation of the autonomous vehicle to detect obstacles present in the environment surrounding the autonomous vehicle.

Figure 7C:
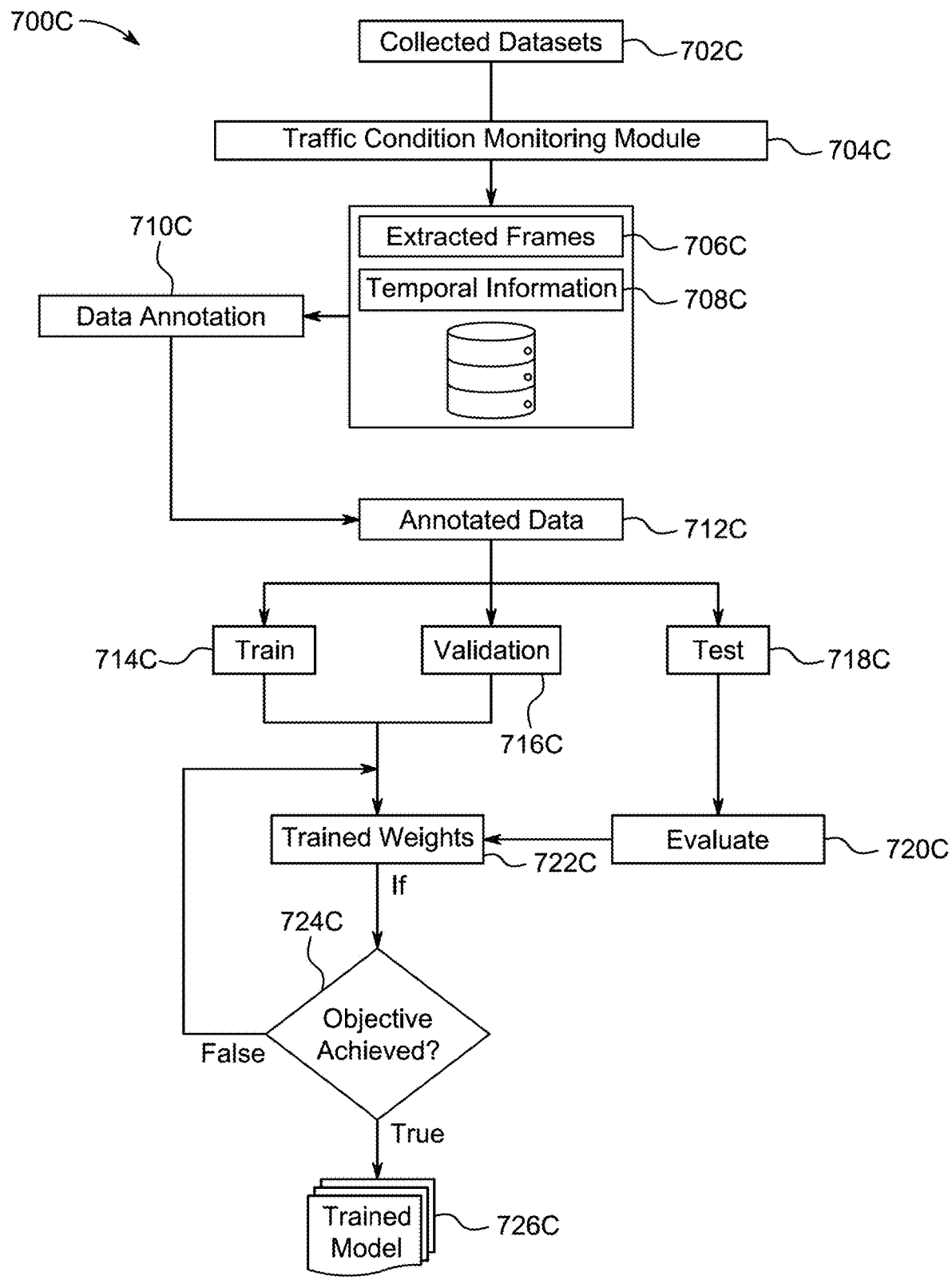
FIG. 7C is an exemplary diagram depicting a process flow for training and evaluating models within the control system based on traffic conditions, according to certain embodiments.

Referring now to FIG. 7C, the present diagram provides an exemplary diagram depicting a process flow 700C for training and evaluating models within the control system based on traffic conditions, according to certain embodiments. At step 704C, the traffic condition monitoring module (e.g., the traffic condition monitoring circuitry) uses the collected dataset depicted via step 702C. The collected datasets depicted via step 702C may correspond to the collected datasets at step 618. In particular, the traffic condition monitoring module uses the speed, distance, and traffic monitoring dataset (e.g., data including vehicle speed, inter-vehicle distance, congestion levels, and other traffic flow parameters) from the collected dataset to train and validate a deep learning model, e.g., the deep learning model 114. Initially, the traffic condition monitoring module is configured to extract frames and temporal sequences from the speed, distance, and traffic monitoring dataset (e.g., data indicating various traffic conditions) as mentioned via step 706C and step 708C, respectively. These frames and temporal sequences include contextual metrics relevant to traffic congestion, vehicle spacing, and relative speeds in real-world scenarios. Further, at step 710C, data annotation is performed on the extracted frames and temporal sequences to label traffic conditions such as "heavy traffic congestion," "moderate congestion," "light traffic congestion," and other contextual tags based on predefined thresholds and road scenarios to generate annotated data as depicted via step 712C. For example, a predefined threshold for a traffic condition "heavy traffic congestion" may be defined as 90%. A manufacturer of autonomous vehicles may define these thresholds based on the requirements of the autonomous vehicles being manufactured.

Once the annotated data is generated, the annotated data is divided into a training dataset, a validation dataset, and a test dataset, as depicted via steps 714C, 716C, and 718C, respectively. The training dataset is used to train the deep learning model to identify and predict current traffic conditions accurately. The validation dataset is used to tune and monitor the deep learning model's performance, ensuring that the deep learning model generalizes well to new traffic patterns before being evaluated using the test dataset. At step 720C, the deep learning model is further evaluated based on the test dataset. Further, based on the training and validation process performed for the deep learning model, at step 722C, trained weights are generated. At step 720C, the deep learning model is further evaluated based on the test dataset. Further, based on the evaluation, the trained weights generated for the deep learning model are adjusted. At step 724C, a performance check is done to determine if a training objective (e.g., an accuracy or a precision threshold of the deep learning model) is achieved or not. In one embodiment, when the training objective is not achieved, step 722C is re-executed. In another embodiment, when the training objective is achieved, at step 726C, the trained deep learning model is used during real-time navigation to analyze traffic conditions.

Figure 8:
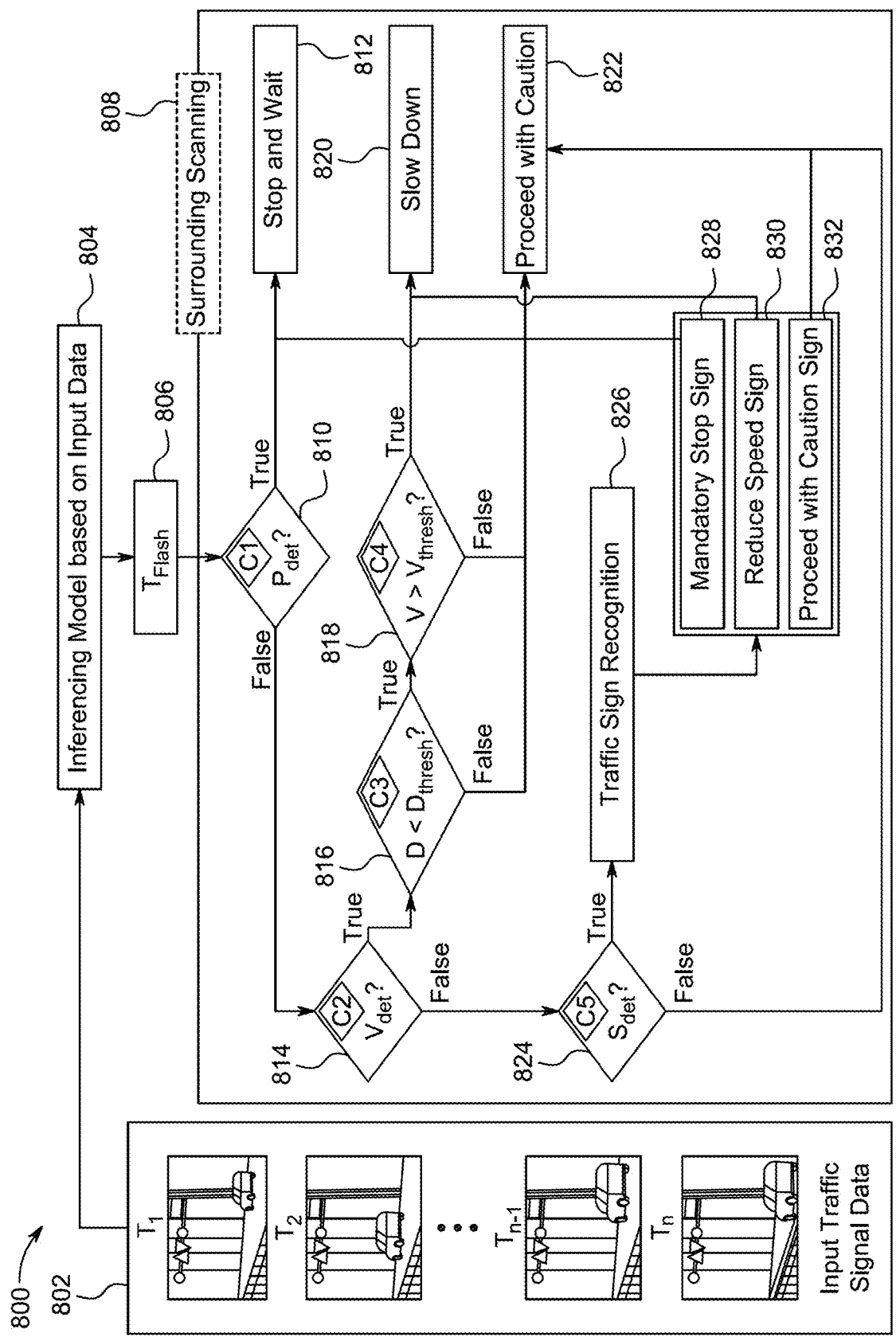
FIG. 8 is an exemplary diagram depicting a process flow of an interaction of the control system with traffic lights, according to certain embodiments.

Referring now to FIG. 8, the present diagram provides an exemplary diagram depicting a process flow 800 of an interaction of the control system 102 with traffic lights, according to certain embodiments. In particular, the process flow 800 depicts a traffic light signal analysis and decision-making performed by the control system 102 of the autonomous vehicle, particularly involving a flashing traffic light, i.e., the flashing signal. Initially, at step 802, input traffic signal data is received by the control system 102 in the form of a sequence of image frames, e.g., $T_1, T_2, \ldots, T_n$, representing the state of a traffic light over time. In an embodiment, the input traffic signal data may be captured using the at least one sensor 104. At step 804, the sequence of image frames are processed by the deep learning model (also referred to as an inferencing model) to detect and classify traffic light states in the sequence of image frames. Further, at step 806, an identification is done to detect whether the traffic light is in flashing mode ($T_{flash}$). As discussed above, the control system 102 is configured to distinguish between a flashing light and a regular cyclic traffic light that cycles through different colors according to a cycle timing pattern. Upon detecting the flashing mode for the traffic light, at step 808, the control system 102 initiates surrounding scanning. In particular, the surrounding scanning circuitry is configured to scan the environment surrounding the autonomous vehicle. The surrounding scanning is performed to identify nearby dynamic obstacles (e.g., pedestrians and vehicles) and static obstacles (e.g., traffic signs).

Further, based on scanning the surrounding environment, at step 810, a check (C1) is performed by the control system 102 to determine whether a pedestrian is detected (Pdet) in the environment surrounding the autonomous vehicle. In one embodiment, based on the check (C1) performed at step 810, if the pedestrian is detected, the control system 102 issues the stop and wait instruction as mentioned at step 812. In another embodiment, based on the check (C1) performed at step 810, if no pedestrian is detected, step 814 is executed. At step 814, a check (C2) is performed to determine whether a nearby vehicle ($V_{det}$) is detected in the environment surrounding the autonomous vehicle. In one embodiment, based on the check (C2) performed at step 814, if the nearby vehicle is detected, at step 816, a check (C3) is performed to determine whether the distance between the autonomous vehicle and the nearby vehicle is less than a pre-defined distance threshold ($D_{thresh}$), e.g., a relative distance. In one embodiment, based on the check (C3) performed at step 816, when the distance is determined to be less than the pre-defined distance threshold ($D_{thresh}$), then step 818 is executed. In an embodiment, the distance 'D' between the autonomous vehicle and the detected nearby vehicle is computed using a detected object's bounding box, which provides an object's height '$H_{image}$' in each image frame. Further, a real-world height of an object (such as a car) is typically known or estimated, denoted as '$H_{real}$'. In particular, the distance between the autonomous vehicle and the detected nearby vehicle is calculated using a pinhole camera model, as defined by an equation 1.

$$D = \frac{H_{real} \times f}{H_{image}} \quad (1)$$

In equation 1, '$H_{real}$' is an estimated real-world height of the detected nearby vehicle. '$H_{image}$' is the height of the detected nearby vehicle in pixels in an image frame. Further, 'f' is a focal length that is determined using an equation 2.

$$f = \frac{\text{image dimension (height or width)}}{2 \times \tan\frac{Fov}{2}} \quad (2)$$

In equation 2, 'Fov' represents field of view of the at least one sensor (e.g., a vision sensor). Further, at step 818, a check (C4) is performed to determine whether the speed (V) of the autonomous vehicle is greater than a pre-defined speed threshold ($V_{thresh}$), e.g., 30%. Based on the check (C4) performed at step 818, when the speed of the autonomous vehicle is greater than the pre-defined speed threshold ($V_{thresh}$), at step 820, the control system 102 generates the slow down instruction. Further, based on the check (C4) performed at step 818, when the speed of the autonomous vehicle is less than the pre-defined speed threshold ($V_{thresh}$), the control system 102 generates the proceed with caution instruction as depicted via step 822. In another embodiment, based on the check (C3) performed at step 816, when the distance is determined to be greater than the pre-defined distance threshold ($D_{thresh}$), the control system 102 generates the proceed with caution instruction as depicted via step 822.

In another embodiment, based on the check (C2) performed at step 814, if no nearby vehicle is detected, at step 824, a check (C5) is performed to detect the presence of traffic signs ($S_{det}$) in the environment surrounding the autonomous vehicle. In a first embodiment, if no traffic sign is detected, the control system 102 generates the 'proceed with caution' instruction as depicted via step 822. In a second embodiment, if a traffic sign is detected, at step 826, the control system 102 performs traffic sign recognition to interpret a type of the traffic sign. Further, based on the interpretation of the type of recognized traffic sign, when the recognized traffic sign is the mandatory stop sign, as mentioned in step 828, step 812 is executed. In other words, when the recognized traffic sign is the mandatory stop sign, the control system 102 generates the 'stop and wait' instruction for the autonomous vehicle. Further, when the interpreted type of the traffic sign is the reduced speed sign, as mentioned in step 830, step 820 is executed. In other words, when the interpreted type of the traffic sign is the reduced speed sign, the control system 102 generates the 'slow down' instruction for the autonomous vehicle. Further, when the interpreted type of the traffic sign is the proceed with caution sign as mentioned in step 832, step 822 is executed. In other words, when the interpreted type of the traffic sign is a proceed with caution instruction, the control system 102 generates the 'proceed with caution' instruction for the autonomous vehicle. In an embodiment, the process flow 800 is continuously repeated for each incoming image frame or a selected frame interval, thereby allowing the autonomous vehicle to dynamically adjust its navigation behavior based on real-time traffic light conditions, the presence of nearby road users or vehicles, and regulatory traffic signs.

In an embodiment, Table 1 below represents notations and conditions depicted in process flow 800 along with their corresponding descriptions.

| Notations | Description |
| --- | --- |
| Condition 1 (C1) | Pedestrian detection near the intersection |
| Condition 2 (C2) | Vehicle detection near the intersection. |
| Condition 3 (C3) | Distance threshold checking with the detected vehicle. |
| Condition 4 (C4) | Speed thresholds check for autonomous vehicles. |
| Condition 5 (C5) | Traffic sign detection |
| $T_1, T_2 \ldots, T_n$ | Frames captured at different time intervals from an input video sequence. |
| $T_{flash}$ | Detected flashing traffic light |
| $V_{det}$ | Vehicle detection |
| $S_{det}$ | Traffic sign detection |
| D | Distance between an autonomous vehicle and the detected vehicle. |
| $D_{thresh}$ | Distance threshold |
| V | Speed of the autonomous vehicle |
| $V_{thresh}$ | Speed threshold |

Table 1 represents notations and conditions in flashing traffic light architecture.

Figure 9:
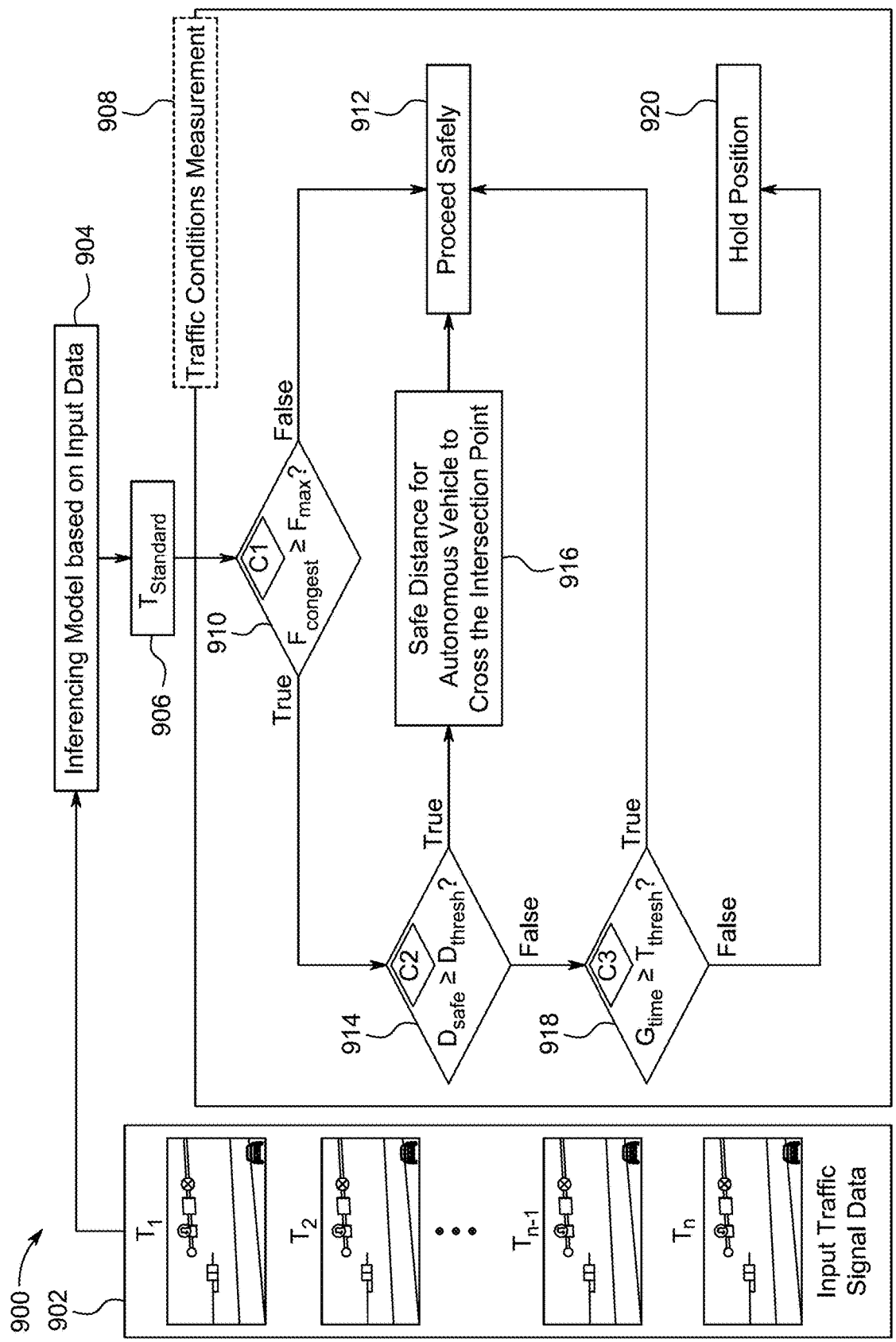
FIG. 9 is an exemplary diagram depicting a process flow demonstrating the control system's response to traffic congestion, according to certain embodiments.

Referring now to FIG. 9, the present diagram provides an exemplary diagram depicting a process flow 900 demonstrating the response of control system 102 to traffic congestion, according to certain embodiments. In particular, the process flow 900 depicts the working of the control system 102 when the autonomous vehicle is navigating through an intersection under regular traffic light conditions, specifically when the traffic light is green. Initially, at step 902, input traffic signal data is received by the control system 102 in the form of sequential image frames, i.e., $T_1, T_2, \ldots, T_n$, where each frame contains real-time traffic information. Further, at step 904, each image frame is processed using an inferencing model (i.e., the deep learning model 114). Further, based on the processing, at step 906, the inferencing model is configured to detect whether the state of the traffic light is green ($T_{standard}$). Upon detecting the state of the traffic light to be steady green, at step 908, traffic conditions measurement is performed by the control system 102. In an embodiment, the traffic conditions measurement includes detecting vehicles within a defined region around the intersection. In response to measuring the traffic conditions, at step 910, a check (C1) is performed by the control system 102 to determine whether traffic congestion ($F_{congest}$) at the intersection is greater than or equal to a predefined congestion threshold ($F_{max}$), e.g., 80%. In an embodiment, the traffic congestion at the intersection is determined by computing a vehicle density 'ρ' in the defined region. The vehicle density 'ρ' in the defined region is computed using an equation 3.

$$\rho = \frac{\text{Number of detected vehicles in the region}}{\text{Area of the defined region}} \quad (3)$$

Further, based on the check (C1) performed at step 910, when the traffic congestion ($F_{congest}$) at the intersection is determined to be less than the predefined congestion threshold ($F_{max}$), step 912 is executed. At step 912, the control system 102 generates a 'proceed safely' instruction for the autonomous vehicle. In another embodiment, based on the check (C1) performed at step 910, when the traffic congestion ($F_{congest}$) at the intersection is determined to be greater than or equal to the predefined congestion threshold ($F_{max}$), step 914 is executed. At step 914, a check (C2) is performed to determine if a safe distance ($D_{safe}$) is maintained between the autonomous vehicle and other road-related obstacles, such as, the pedestrian, the nearby vehicle, and other moving objects. In an embodiment, the safe distance ($D_{safe}$) is computed using the pinhole camera model as depicted via equation 1. In particular, the distance (i.e., the safe distance ($D_{safe}$)) is compared against a predefined safe threshold ($D_{thresh}$), e.g., 2 meters.

In one embodiment, based on the check (C2) performed at step 914, when the distance (i.e., the safe distance ($D_{safe}$)) between the autonomous vehicle and other obstacles is greater than the predefined safe threshold ($D_{thresh}$), step 916 is executed. At step 916, the control system 102 determines that it is safe for the autonomous vehicle to cross the intersection and generates the proceed safely instruction for the autonomous vehicle as mentioned via step 912. In another embodiment, based on the check (C2) performed at step 914, when the distance (i.e., the safe distance ($D_{safe}$)) between the autonomous vehicle and other obstacles is less than the predefined safe threshold ($D_{thresh}$), step 918 is executed.

At step 918, a check (C3) is performed by the control system 102 to determine whether there is sufficient green light time to safely cross the intersection without blocking traffic. To determine whether there is sufficient green light time, an estimated green light time ($G_{time}$) is compared with a pre-defined time threshold ($T_{thresh}$), e.g., 30 seconds. In other words, the check (C3) is performed to determine whether the estimated green light time ($G_{time}$) is greater than or equal to the pre-defined time threshold ($T_{thresh}$). Based on the check (C3) performed at step 918, when the estimated green light time ($G_{time}$) is greater than or equal to the pre-defined time threshold ($T_{thresh}$), step 912 is executed. At step 912, the control system 102 generates the proceed safely instruction for the autonomous vehicle. Further, based on the check (C3) performed at step 918, when the estimated green light time ($G_{time}$) is determined to be less than the pre-defined time threshold ($T_{thresh}$), step 920 is executed. At step 920, the control system 102 generates the hold position instruction for the autonomous vehicle.

In an embodiment, Table 2 below represents notations and conditions depicted in process flow 900 along with their corresponding descriptions.

| Notations | Description |
| --- | --- |
| Condition 1 (C1) | Traffic congestion detection at the intersection |
| Condition 2 (C2) | Distance measurement for the autonomous vehicles to cross the intersections |
| Condition 3 (C3) | Monitors the remaining green light time at the intersection |
| $T_{standrad}$ | Detected standard traffic light |
| $F_{max}$ | Maximum congestion threshold |
| $F_{congest}$ | Congestion detection at the intersection |
| $D_{safe}$ | Safe distance |
| $G_{time}$ | Green signal time |
| $T_{thresh}$ | The threshold for remaining for the green signal |
| $T_1, T_2 \ldots, T_n$ | Frames captured at different time intervals from an input video sequence. |
| D | Distance between an autonomous vehicle and the detected vehicle. |
| $D_{thresh}$ | Distance threshold |

Table 2 represents notations and conditions in a congested intersection architecture.

Figure 10:
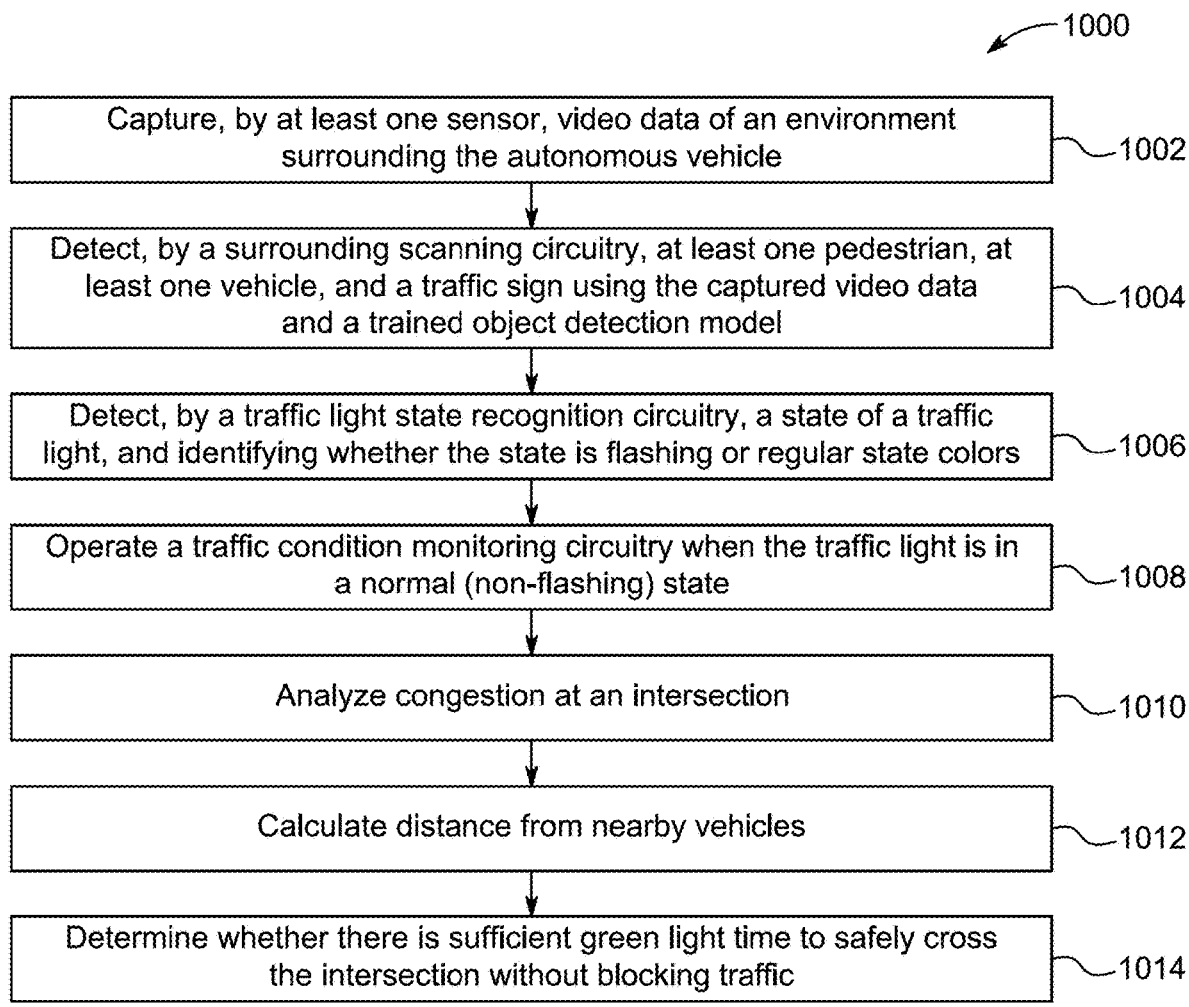
FIG. 10 is an exemplary diagram of a method of controlling the autonomous vehicle, according to certain embodiments.

Referring now to FIG. 10, the present diagram provides an exemplary flowchart of a method 1000 of controlling an autonomous vehicle, according to certain embodiments. In an embodiment, the autonomous vehicle may correspond to the autonomous vehicle 202A. The autonomous vehicle is a self-driving vehicle capable of sensing its surrounding environment and making driving decisions without human input. Examples of the autonomous vehicle may include the self-driving car, the self-driven delivery vehicle, the self-driven transport vehicle, and other driverless vehicles. In order to control the autonomous vehicle, initially at step 1002, the video data of the environment surrounding the autonomous vehicle may be captured. The environment surrounding the autonomous vehicle refers to an area (i.e., the defined area) around the autonomous vehicle that is captured and analyzed to make real-time driving decisions. In an embodiment, the video data may be captured using the at least one sensor (e.g., the sensor 104). Examples of the at least one sensor may include, but are not limited to, the monocular cameras, the stereo vision cameras, the infrared night vision cameras, the surround-view camera systems, and the RGB-D cameras. In addition, at least one camera may also include LiDAR sensors, radar, ultrasonic sensors, infrared sensors, speed sensors, and other vision sensors. In an embodiment, the surrounding scanning circuitry is configured to detect pedestrians, nearby vehicles, and traffic signs using the captured video data and the trained deep learning model to detect and analyze multiple objects, including the pedestrians, the nearby vehicles, and their proximity in terms of speed and distance. In an embodiment, the multiple obstacle detector in the surrounding scanning circuitry is trained to detect objects in the surroundings, including the pedestrians, the vehicles, and the traffic signs.

Upon capturing the video data, at step 1004, the at least one pedestrian, the at least one vehicle, and the traffic sign may be detected using the captured video. In an embodiment, the surrounding scanning circuitry may be configured to detect the at least one pedestrian, the at least one vehicle, and the traffic sign from the captured video data using the trained object detection model, i.e., the object detection model 112. In an embodiment, the traffic sign may be the mandatory stop sign, the reduced speed sign, and the proceed with caution sign. In some embodiments, the traffic sign may be the pedestrian crossing sign, the directional signs indicating routes, and vehicle travel indications.

Further, at step 1006, the state of the traffic light is detected. Further, an identification is done to determine whether the state of the traffic light is the flashing signal or the regular cyclic state colors. The flashing signal corresponds to a blinking signal, while the regular cyclic state colors depict standard traffic signal indications, i.e., red, green, and yellow of the traffic light. In an embodiment, the detection and identification of the state of the traffic light may be performed by the traffic light state recognition circuitry. In an embodiment, the traffic light states recognizer model in the traffic light state recognition circuitry is used to detect the state of traffic lights, including detection of flashing signals or cyclic state colors. Further, at step 1008, the traffic condition monitoring circuitry is operated when the traffic light is in the normal (non-flashing) state (e.g., the green light). In response to operating the traffic condition monitoring circuitry, at step 1010, the traffic condition monitoring circuitry is configured to analyze traffic congestion at the intersection. The intersection refers to a point where two or more roads cross or meet, where vehicles, pedestrians, and sometimes bicycles can change direction, merge, or cross paths. In other words, the traffic condition monitoring circuitry checks how busy or crowded the intersection is.

Further, based on the analysis, at step 1012, the distance from the nearby vehicles is calculated. In other words, the traffic condition monitoring circuitry is configured to calculate the distance of the autonomous vehicle from the nearby vehicles. Further, based on the calculated distance, at step 1014, the traffic condition monitoring circuitry is configured to determine whether there is sufficient green light time to safely cross the intersection without blocking traffic. In an embodiment, if it is determined that there is sufficient green light time, a presence or an absence of the at least one pedestrian is detected. Further, when the presence of the at least one pedestrian at the intersection is detected, the stop instruction (also referred to as the stop and wait instruction) is executed to stop the autonomous vehicle. In an embodiment, the stop instruction can be executed by the vehicle control circuitry.

Further, in response to executing the vehicle control circuitry, the speed and distance of the nearby vehicles from the autonomous vehicle can be measured. Once the speed and direction of the nearby vehicles are measured, the vehicle control circuitry is configured to adjust the movement of the autonomous vehicle based on the measured speed and distance. For example, if a detected nearby vehicle is moving away and is at a certain distance running at a certain speed, the movement of the autonomous vehicle can be adjusted to proceed safely through the intersection. In addition, the vehicle control circuitry is configured to change the movement of the autonomous vehicle based on the detected traffic sign. For example, when the detected traffic sign is the mandatory stop sign (e.g., the red light), the vehicle control circuitry is configured to generate the stop and wait instruction for the autonomous vehicle.

In an embodiment, when the traffic light state recognition circuitry detects that the traffic light is flashing, the surrounding scanning circuitry is configured to check for the at least one pedestrian. Further, based on the check performed, when the at least one pedestrian is detected, the stop instruction is executed immediately to stop the autonomous vehicle. In an embodiment, the autonomous vehicle remains stopped until the surrounding scanning circuitry verifies that the at least one pedestrian has cleared a path of the autonomous vehicle. Further, based on the check performed, when the at least one pedestrian is not detected, the surrounding scanning circuitry checks for the presence of nearby parked or approaching vehicles. Further, when the presence of nearby vehicles is detected, the distance of the autonomous vehicle to each of the nearby vehicles and the speed of each of the nearby vehicles are calculated to assess whether it is safe for the autonomous vehicle to proceed. In an embodiment, when a nearby vehicle is within a predetermined distance (e.g., 5 meters) or is moving above a predetermined speed (e.g., 40 kmph), the vehicle control circuitry executes an instruction to slow down or stop the autonomous vehicle.

In an embodiment, the surrounding scanning circuitry is configured to recognize the mandatory stop sign. Upon recognizing the mandatory stop sign, the vehicle control circuitry is configured to execute the stop instruction to stop the autonomous vehicle. Further, the surrounding scanning circuitry is configured to recognize the speed-reducing sign. In response to recognizing the speed-reducing sign, the vehicle control circuitry is configured to reduce the speed of the autonomous vehicle to a level specified by a speed-reducing sign or a speed limit sign. Additionally, the surrounding scanning circuitry is configured to recognize the 'proceed with caution' sign. In response to recognizing the proceed with caution sign, the vehicle control circuitry is configured to proceed the movement of the autonomous vehicle cautiously.

In an embodiment, when the traffic light state recognition circuitry detects that the traffic light is in the normal state, in which the traffic light is steady green or yellow, the traffic condition monitoring circuitry is configured to assess a level of traffic congestion at the intersection. In an embodiment, the traffic condition monitoring circuitry is configured to assess the traffic congestion level at the intersection by calculating vehicle density based on a number of vehicles detected in a region (i.e., the defined region). Further, based on assessing the level of traffic congestion at the intersection, when no traffic congestion is detected, the vehicle control circuitry is configured to proceed with the movement of the autonomous vehicle safely. Furthermore, based on assessing the level of traffic congestion at the intersection, when high traffic congestion is detected at the intersection, the distance of the autonomous vehicle from the nearby vehicles and the speed of the nearby vehicles are calculated. In response to determining the level of traffic congestion at the intersection, assessing whether it is safe for the autonomous vehicle to proceed through the intersection. In an embodiment, when it is determined that proceeding would create a lane blockage condition for vehicles, the vehicle control circuitry is configured to execute an instruction to stop or slow down the autonomous vehicle to avoid causing traffic congestion.

In an embodiment, when the traffic light state recognition circuitry detects that the traffic light is in the regular state, in which the traffic light is steady green, a remaining time for green light is calculated. The remaining time for the green light is calculated to ensure the autonomous vehicle can safely cross the intersection before the traffic light turns yellow or red. In an embodiment, when there is insufficient time for the autonomous vehicle to cross the intersection safely, the vehicle control circuitry is configured to execute an instruction to stop the autonomous vehicle and wait for a next green light.

The present disclosure provides a comprehensive and intelligent system (i.e., the control system 102) for autonomous vehicle navigation that significantly advances the state of the art in traffic-aware decision-making. The present disclosure incorporates a number of novel features that enhance safety, efficiency, and adaptability in dynamic urban environments. The present disclosure leverages spatiotemporal features to accurately recognize traffic light states, including both regular and flashing signals, ensuring reliable interpretation under varying conditions. The present disclosure employs a sequential environmental scanning process that prioritizes pedestrian detection, followed by vehicle detection and traffic sign recognition, to make tiered decisions regarding whether to stop, slow down, or proceed with caution. The present disclosure introduces a congestion detection mechanism at intersections by evaluating real-time traffic density and computing safe inter-vehicle distances to prevent intersection blockage. The present disclosure includes a green signal timing analysis that verifies whether sufficient time remains for the autonomous vehicle to safely clear an intersection before proceeding. The present disclosure integrates advanced navigation strategies to handle complex scenarios such as heavy traffic congestion or flashing traffic signals. Further, all features provided by the present disclosure are supported by a real-time decision-making engine that continuously adapts vehicle behavior based on surrounding traffic conditions, thereby delivering a robust solution for next-generation autonomous mobility.

Figure 11:
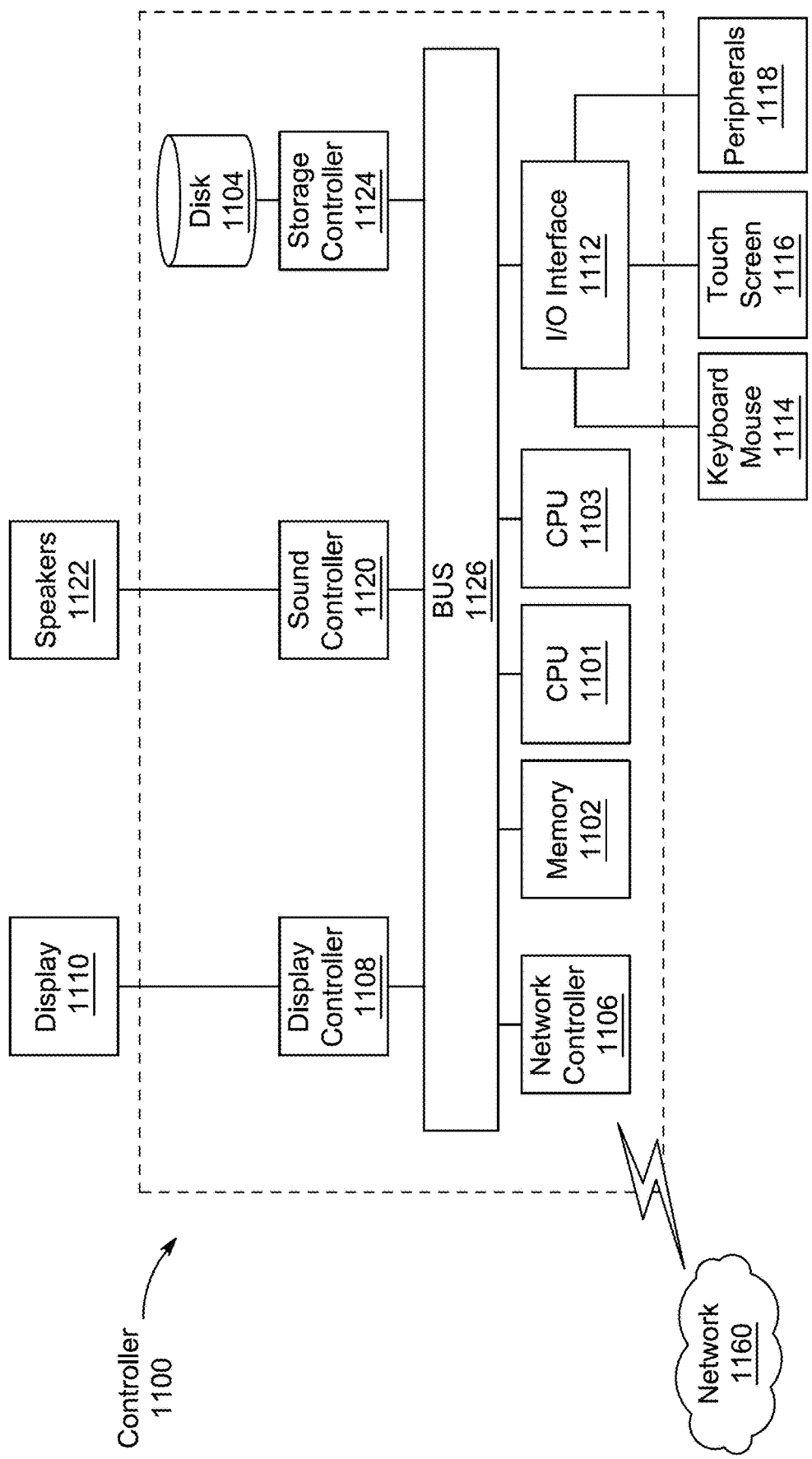
FIG. 11 is an illustration of a non-limiting example of details of computing hardware used in the computing system, according to certain embodiments.

Next, further details of the hardware description of the computing environment according to exemplary embodiments are described with reference to FIG. 11. In FIG. 11, a controller 1100 is described as representative of the control system 102 of FIG. 1 in which the controller 1100 is a computing device which includes a CPU 1101 which performs the processes described above/below. The process data and instructions may be stored in a memory 1102 (same as the memory 110). These processes and instructions may also be stored on a storage medium disk 1104, such as a Hard Disk Drive (HDD) or a portable storage medium or may be stored remotely.

Further, the claims are not limited by the form of the computer-readable media on which the instructions of the inventive process are stored. For example, the instructions may be stored on Compact Disks (CDs), Digital Versatile Discs (DVDs), in a Flash memory, a RAM, a ROM, a Programmable Read-Only Memory (PROM), an EPROM, an Electrically Erasable Programmable Read-Only Memory (EEPROM), a hard disk or any other information processing device with which the computing device communicates, such as a server or a computer.

Further, the claims may be provided as a utility application, background daemon, or component of an operating system, or combination thereof, executing in conjunction with the CPU 1101, 1103 and an operating system such as a Microsoft Windows 10, a Microsoft Windows 11, a UNIX, a Solaris, a LINUX, an Apple MAC-OS and other systems known to those skilled in the art.

The hardware elements in order to achieve the computing device may be realized by various circuitry elements, known to those skilled in the art. For example, the CPU 1101 or CPU 1103 may be a Xenon or a Core processor from Intel of America or an Opteron processor from Advanced Micro Devices (AMD) of America, or may be other processor types that would be recognized by one of ordinary skill in the art. Alternatively, the CPU 1101, 1103 may be implemented on a Field-Programmable Gate Array (FPGA), an Application-Specific Integrated Circuit (ASIC), a Programmable Logic Device (PLD) or using discrete logic circuits, as one of ordinary skill in the art would recognize. Further, the CPU 1101, 1103 may be implemented as multiple processors cooperatively working in parallel to perform the instructions of the inventive processes described above.

The computing device in FIG. 11 also includes a network controller 1106, such as an Intel Ethernet Professional (PRO) network interface card from an Intel Corporation of America, for interfacing with a network 1160. As can be appreciated, the network 1160 can be a public network, such as the Internet, or a private network such as a LAN or a WAN, or any combination thereof and can also include a PSTN or an Integrated Services Digital Network (ISDN) sub-networks. The network 1160 can also be wired, such as an Ethernet network, or can be wireless such as a cellular network including EDGE, Third Generation (3G) and Fourth Generation (4G) wireless cellular systems. The wireless network can also be a WiFi, a Bluetooth, or any other wireless form of communication that is known.

The computing device further includes a display controller 1108, such as a NVIDIA GeForce Giga Texel Shader eXtreme (GTX) or a Quadro graphics adaptor from a NVIDIA Corporation of America for interfacing with a display 1110, such as a Hewlett Packard HPL2445w Liquid Crystal Display (LCD) monitor. A general purpose I/O interface 1112 interfaces with a keyboard and/or mouse 1114 as well as a touch screen panel 1116 on or separate from display 1110. The general purpose I/O interface 1112 also connects to a variety of peripherals 1118 including printers and scanners, such as an OfficeJet or DeskJet from HP.

A sound controller 1120 is also provided in the computing device, such as a Sound Blaster X-Fi Titanium from Creative, to interface with speakers/microphone 1122, thereby providing sounds and/or music.

A general-purpose storage controller 1124 connects the storage medium disk 1104 with a communication bus 1126, which may be an Industry Standard Architecture (ISA), an Extended Industry Standard Architecture (EISA), a Video Electronics Standards Association (VESA), a Peripheral Component Interconnect (PCI), or similar, for interconnecting all of the components of the computing device. A description of the general features and functionality of the display 1110, keyboard and/or mouse 1114, as well as the display controller 1108, the general purpose storage controller 1124, the network controller 1106, the sound controller 1120, and the general purpose I/O interface 1112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 12.

Figure 12:
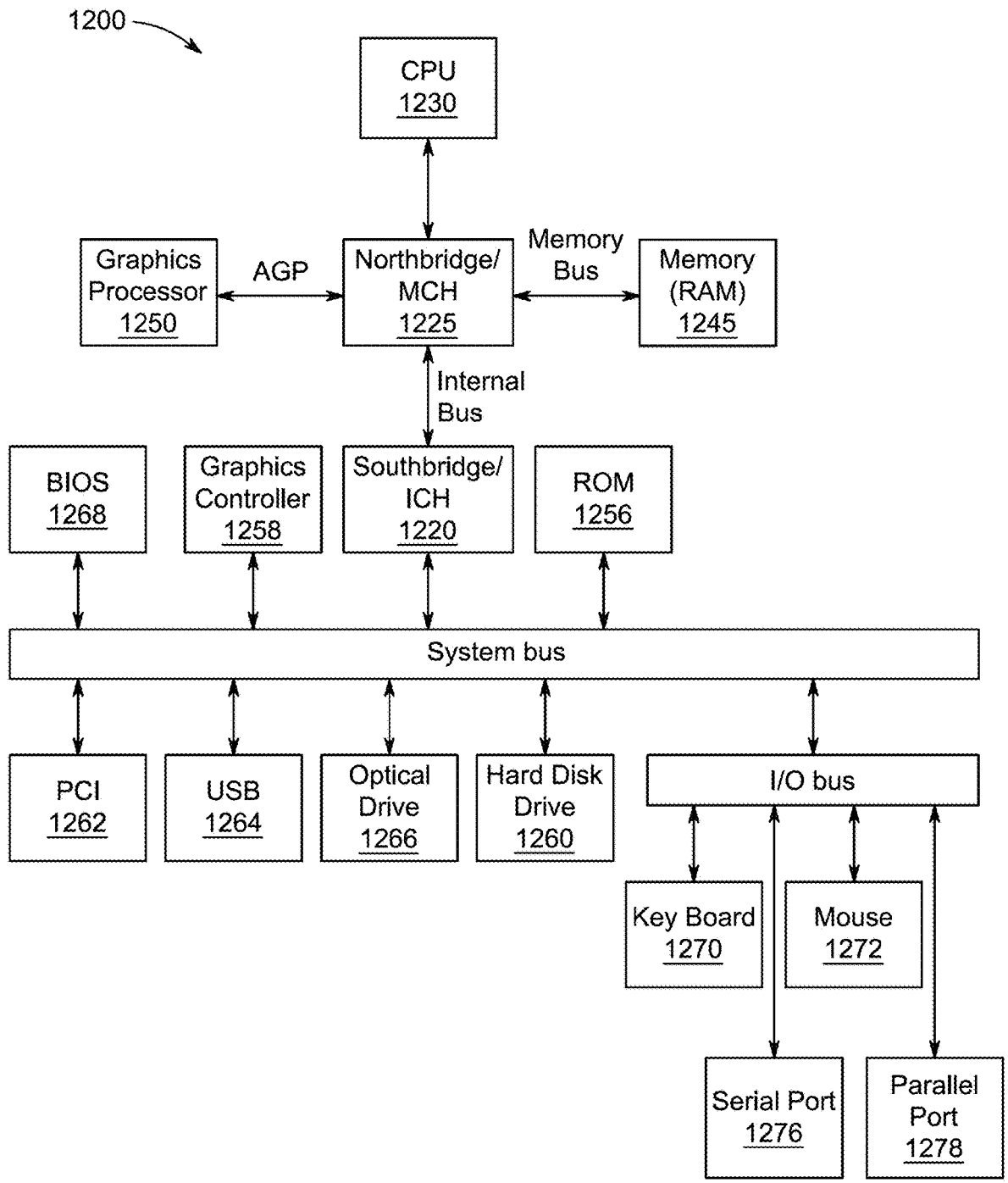
FIG. 12 is an exemplary schematic diagram of a data processing system used within the computing system, according to certain embodiments.

FIG. 12 shows a schematic diagram of a data processing system 1200, according to certain embodiments, for performing the functions of the exemplary embodiments. The data processing system 1200 is an example of a computer in which code or instructions implementing the processes of the illustrative embodiments may be located.

In FIG. 12, the data processing system 1200 employs a hub architecture including a North Bridge and a Memory Controller Hub (NB/MCH) 1225 and a south bridge and an I/O Controller Hub (SB/ICH) 1220. A CPU 1230 is connected to the NB/MCH 1225. The NB/MCH 1225 also connects to a memory 1245 via a memory bus and connects to a graphics processor 1250 via an Accelerated Graphics Port (AGP). The NB/MCH 1225 also connects to the SB/ICH 1220 via an internal bus (e.g., a unified media interface or a direct media interface). The CPU 1230 may contain one or more processors and even may be implemented using one or more heterogeneous processor systems.

Figure 13:
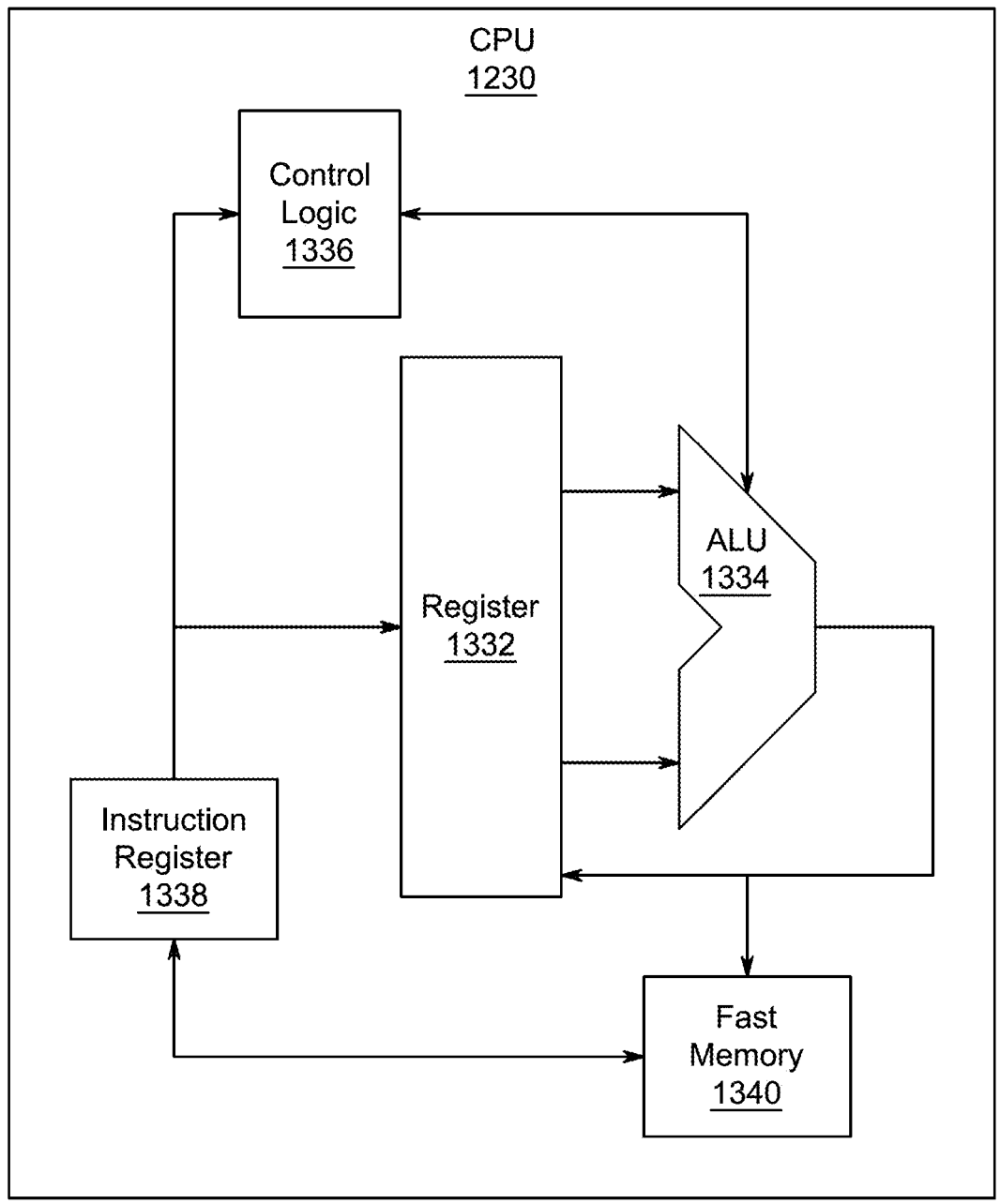
FIG. 13 is an exemplary schematic diagram of a processor used with the computing system, according to certain embodiments.

For example, FIG. 13 shows one implementation of the CPU 1230. In one implementation, an instruction register 1338 retrieves instructions from a fast memory 1340. At least part of these instructions is fetched from the instruction register 1338 by a control logic 1336 and interpreted according to the instruction set architecture of the CPU 1230. Part of the instructions can also be directed to a register 1332. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using an Arithmetic Logic Unit (ALU) 1334 that loads values from the register 1332 and performs logical and mathematical operations on the loaded values according to the instructions. The results from these operations can be feedback into the register 1332 and/or stored in the fast memory 1340. According to certain implementations, the instruction set architecture of the CPU 1230 can use a reduced instruction set architecture, a complex instruction set architecture, a vector processor architecture, and a very large instruction word architecture. Furthermore, the CPU 1230 can be based on a Von Neuman model or a Harvard model. The CPU 1230 can be a digital signal processor, an FPGA, an ASIC, a Programmable Logic Array (PLA), a PLD, or a Complex Programmable Logic Device (CPLD). Further, the CPU 1230 can be an x86 processor by the Intel or by the AMD; an Advanced Reduced Instruction Set Computing (RISC) Machine (ARM) processor, a power architecture processor by, e.g., an International Business Machines Corporation (IBM); a Scalable Processor Architecture (SPARC) processor by Sun Microsystems or by Oracle; or other known CPU architecture.

Referring again to FIG. 12, the data processing system 1200 can include that the SB/ICH 1220 is coupled through a system bus to an I/O Bus, a ROM 1256, a Universal Serial Bus (USB) port 1264, a flash Binary Input/Output System (BIOS) 1268, and a graphics controller 1258. PCI/PCIe devices can also be coupled to SB/ICH 1220 through a PCI bus 1262.

The PCI devices may include, for example, Ethernet adapters, add-in cards, and Personal Computer (PC) cards for notebook computers. The HDD 1260 and an optical drive 1266 (e.g., CD-ROM) can use, for example, an Integrated Drive Electronics (IDE) or a Serial Advanced Technology Attachment (SATA) interface. In one implementation, an I/O bus can include a super I/O (SIO) device.

Further, the HDD 1260 and the optical drive 1266 can also be coupled to the SB/ICH 1220 through a system bus. In one implementation, a keyboard 1270, a mouse 1272, a serial port 1276, and a parallel port 1278 can be connected to the system bus through the I/O bus. Other peripherals and devices that can be connected to the SB/ICH 1220 using a mass storage controller such as the SATA or a Parallel Advanced Technology Attachment (PATA), an Ethernet port, an ISA bus, a Low Pin Count (LPC) bridge, a System Management (SM) bus, a Direct Memory Access (DMA) controller, and an Audio Compressor/Decompressor (Codec).

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

Figure 14:
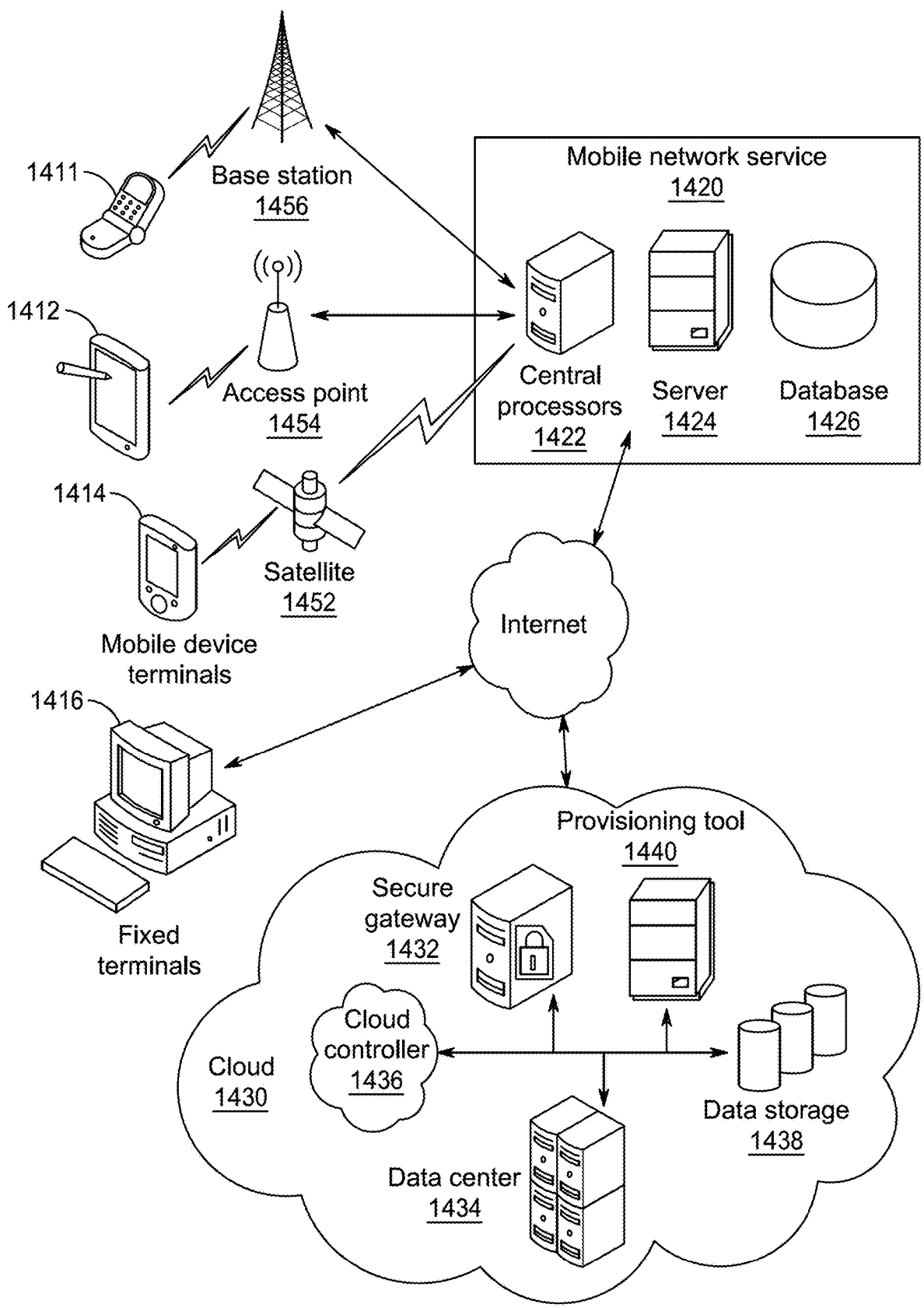
FIG. 14 is an illustration of a non-limiting example of distributed components that may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 14, in addition to various human interface and communication devices (e.g., display monitors, smart phones, tablets, personal digital assistants (PDAs). More specifically, FIG. 14 illustrates client devices including a smart phone 1411, a tablet 1412, a mobile device terminal 1414 and fixed terminals 1416. These client devices may be commutatively coupled with a mobile network service 1420 via a base station 1456, an access point 1454, a satellite 1452 or via an internet connection. The mobile network service 1420 may comprise central processors 1422, a server 1424 and a database 1426. The fixed terminals 1416 and the mobile network service 1420 may be commutatively coupled via an internet connection to functions in cloud 1430 that may comprise a security gateway 1432, a data center 1434, a cloud controller 1436, a data storage 1438 and a provisioning tool 1440. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. An autonomous vehicle control system, comprising:
at least one sensor configured to capture video data of an environment surrounding an autonomous vehicle;
a controller including a processor having:
 a vehicle control circuitry;
 a surrounding scanning circuitry configured to detect pedestrians, vehicles, and traffic signs using the captured video data and a trained object detection model;
 a traffic light state recognition circuitry configured to detect and distinguish a state of a traffic light between whether the state is a flashing signal or regular cyclic state colors;
 a traffic condition monitoring circuitry configured to operate when the traffic light is in the regular (non-flashing) cyclic state, analyze congestion at an intersection, calculate distance from nearby vehicles, and determine whether there is sufficient green light time to safely cross the intersection without blocking traffic,
wherein the vehicle control circuitry is configured to execute a stop instruction to stop the autonomous vehicle when at least one pedestrian is detected by the surrounding scanning circuitry,
adjust a movement of the autonomous vehicle based on speed and distance measured by the surrounding scanning circuitry, and
change the movement of the autonomous vehicle based on a traffic sign recognized by the surrounding scanning circuitry.

2. The system of claim 1, wherein
the vehicle control circuitry is further configured to
immediately execute the stop instruction to stop the autonomous vehicle when the traffic light state recognition circuitry detects that the traffic light is flashing and when the surrounding scanning circuitry detects the at least one pedestrian, wherein the autonomous vehicle remains stopped until the surrounding scanning circuitry verifies that the at least one pedestrian has cleared a path of the autonomous vehicle;
the surrounding scanning circuitry is further configured to check a presence of the nearby vehicles when the at least one pedestrian is not detected,
wherein the vehicle control circuitry is further configured to
calculate a distance to the nearby vehicles and a speed of the nearby vehicles to assess whether it is safe for the autonomous vehicle to proceed, and
execute an instruction to slow down or stop the autonomous vehicle when a nearby vehicle is within a predetermined distance or is moving above a predetermined speed.

3. The system of claim 1,
wherein the surrounding scanning circuitry is further configured to recognize a mandatory stop sign, and wherein the vehicle control circuitry is configured to execute the stop instruction to stop the autonomous vehicle.

4. The system of claim 1,
wherein the surrounding scanning circuitry is further configured to recognize a speed-reducing sign, wherein the vehicle control circuitry is configured to reduce the speed of the autonomous vehicle to a level specified by the speed-reducing sign.

5. The system of claim 1,
wherein the surrounding scanning circuitry is further configured to recognize a proceed with caution sign, and wherein the vehicle control circuitry is configured to proceed to move the autonomous vehicle cautiously.

6. The system of claim 1, wherein,
the traffic condition monitoring circuitry is further configured to assess a level of congestion at the intersection when the traffic light state recognition circuitry detects that the traffic light is in the normal state in which the traffic light is steady green or yellow, and wherein
the vehicle control circuitry is further configured to proceed to move the autonomous vehicle safely when no congestion is detected;
calculate distance to the nearby vehicles and speed of the nearby vehicles, and assess whether it is safe for the autonomous vehicle to proceed through the intersection, when high congestion is detected; and execute an instruction to stop or slow down the autonomous vehicle to avoid causing congestion when proceeding creates a lane blockage condition for the vehicles.

7. The system of claim 6, wherein the vehicle control circuitry is further configured to
calculate a remaining time for the green light to ensure the autonomous vehicle can safely cross the intersection before the traffic light turns yellow or red when the traffic light state recognition circuitry detects that the traffic light is in the normal state in which the traffic light is steady green; and
execute the stop instruction to stop the autonomous vehicle and wait for a next green light when there is insufficient time for the autonomous vehicle to cross the intersection safely.

8. The system of claim 6, wherein the traffic condition monitoring circuitry is further configured to assess a congestion level at the intersection by calculating vehicle density based on a number of vehicles detected in a region.

9. The system of claim 6, wherein the surrounding scanning circuitry is further configured to detect the pedestrians, the vehicles, and the traffic signs using the captured video data and a trained deep learning model to detect and analyze multiple objects, including the pedestrians, the nearby vehicles, and their proximity in terms of speed and distance.

10. The system of claim 1, further comprising a training circuitry configured to train
a multiple obstacle detector in the surrounding scanning circuitry to detect objects in surroundings, including the pedestrians, the vehicles, and the traffic signs; and
a traffic light states recognizer model in the traffic light state recognition circuitry to detect the state of traffic lights, including detection of flashing signals.

11. A method of controlling an autonomous vehicle, comprising:
capturing, by at least one sensor, video data of an environment surrounding the autonomous vehicle;
detecting, by a surrounding scanning circuitry, at least one pedestrian, at least one vehicle, and a traffic sign using the captured video data and a trained object detection model;
detecting, by a traffic light state recognition circuitry, a state of a traffic light, and identifying whether the state is a flashing signal or regular state colors;
operating a traffic condition monitoring circuitry when the traffic light is in a normal (non-flashing) state;
analyzing congestion at an intersection;
calculating distance from nearby vehicles; and
determining whether there is sufficient green light time to safely cross the intersection without blocking traffic, wherein
when a presence of the at least one pedestrian is detected, executing, by a vehicle control circuitry, a stop instruction to stop the autonomous vehicle;
measuring speed and distance of the nearby vehicles;
adjusting, by the vehicle control circuitry, a movement of the autonomous vehicle based on the measured speed and distance of the nearby vehicles; and
changing, by the vehicle control circuitry, the movement of the autonomous vehicle based on the detected traffic sign.

12. The method of claim 11, further comprising:
when the traffic light state recognition circuitry detects that the traffic light is flashing, checking, by the surrounding scanning circuitry, for the at least one pedestrian;
when the at least one pedestrian is detected, immediately executing the stop instruction to stop the autonomous vehicle, wherein the autonomous vehicle remains stopped until the surrounding scanning circuitry verifies that the at least one pedestrian has cleared a path of the autonomous vehicle;
when the at least one pedestrian is not detected, checking, by the surrounding scanning circuitry, a presence of the nearby vehicles;
calculating a distance to the nearby vehicles and the speed of the nearby vehicles to assess whether it is safe for the autonomous vehicle to proceed, wherein when a nearby vehicle is within a predetermined distance or is moving above a predetermined speed, the vehicle control circuitry executes an instruction to slow down or stop the autonomous vehicle.

13. The method of claim 11, further comprising:
recognizing, by the surrounding scanning circuitry, a mandatory stop sign; and
executing, by the vehicle control circuitry, the stop instruction to stop the autonomous vehicle.

14. The method of claim 11, further comprising:
recognizing, by the surrounding scanning circuitry, a speed-reducing sign; and
reducing, by the vehicle control circuitry, the speed of the autonomous vehicle to a level specified by the speed-reducing sign.

15. The method of claim 11, further comprising:
recognizing, by the surrounding scanning circuitry, a proceed with caution sign; and
proceeding, by the vehicle control circuitry, the movement of the autonomous vehicle cautiously.

16. The method of claim 11, further comprising:
when the traffic light state recognition circuitry detects that the traffic light is in the normal state in which the traffic light is steady green or yellow,
assessing, by the traffic condition monitoring circuitry, a level of congestion at the intersection;
when no congestion is detected, proceeding, by the vehicle control circuitry, the movement of the autonomous vehicle safely;
when high congestion is detected, calculating distance to the nearby vehicles and speed of the nearby vehicles;
assessing whether it is safe for the autonomous vehicle to proceed through the intersection;
when it is determined that proceeding creates a lane blockage condition for vehicles, executing an instruction, by the vehicle control circuitry, to stop or slow down the autonomous vehicle to avoid causing congestion.

17. The method of claim 16, further comprising:
when the traffic light state recognition circuitry
detects that the traffic light is in the normal state, in which the traffic light is steady green, calculating a remaining time for green light to ensure the autonomous vehicle can safely cross the intersection before the traffic light turns yellow or red;
when there is insufficient time for the autonomous vehicle to cross the intersection safely, executing, by the vehicle control circuitry, an instruction to stop the autonomous vehicle and wait for a next green light.

18. The method of claim 16, further comprising assessing, by the traffic condition monitoring circuitry, a congestion level at the intersection by calculating vehicle density based on a number of vehicles detected in a region.

19. The method of claim 16, further comprising detecting, by the surrounding scanning circuitry, pedestrians, vehicles, and traffic signs using the captured video data and a trained deep learning model to detect and analyze multiple objects, including the pedestrians, the nearby vehicles, and their proximity in terms of speed and distance.

20. The method of claim 11, further comprising: training a multiple obstacle detector in the surrounding scanning circuitry to detect objects in surroundings, including pedestrians, vehicles, and traffic signs; and a traffic light states recognizer model in the traffic light state recognition circuitry to detect the state of traffic lights, including detection of flashing signals.

\* \* \* \* \*